United States Patent [19]

Nakagawa et al.

[11] Patent Number: 6,078,617
[45] Date of Patent: Jun. 20, 2000

[54] APPARATUS AND METHOD FOR CODING AND DECODING VIDEO IMAGES

[75] Inventors: Akira Nakagawa; Eishi Morimatsu; Kiichi Matsuda, all of Kawasaki, Japan

[73] Assignee: Fujitsu Limited, Kawasaki, Japan

[21] Appl. No.: 08/956,104

[22] Filed: Oct. 24, 1997

[30] Foreign Application Priority Data

Jun. 6, 1997 [JP] Japan ................................. 9-149691

[51] Int. Cl.⁷ .................................................. H04N 7/12
[52] U.S. Cl. ........................ 375/240; 348/409; 348/416; 348/420
[58] Field of Search ................................ 348/390, 395, 348/397, 399, 400–403, 407, 409–413, 415, 416, 420, 424–426, 699; 382/232, 236, 238; 375/240; H04N 7/32, 7/12

[56] References Cited

U.S. PATENT DOCUMENTS

| | | | |
|---|---|---|---|
| 5,113,255 | 5/1992 | Nagata et al. | 348/416 |
| 5,173,773 | 12/1992 | Ueda et al. | 348/402 |
| 5,410,307 | 4/1995 | Hekstra et al. | 348/412 |
| 5,412,428 | 5/1995 | Tahara | 348/395 |
| 5,418,570 | 5/1995 | Ueno et al. | 348/699 |
| 5,475,435 | 12/1995 | Yonemitsu et al. | 348/426 |
| 5,504,530 | 4/1996 | Obikane et al. | 348/413 |
| 5,805,222 | 9/1998 | Nakagawa et al. | 348/401 |
| 5,818,531 | 10/1998 | Yamaguchi et al. | 348/420 |

*Primary Examiner*—Richard Lee
*Attorney, Agent, or Firm*—Staas & Halsey LLP

[57] ABSTRACT

An apparatus and method for coding and decoding digital video images, capable of maintaining the quality of static regions, such as background images, in decoded pictures even when the resolution of pictures has been changed from high to low. The apparatus is equipped with two storage units, low-resolution and high-resolution picture storage units, to hold reference pictures in two different picture formats. When processing coded blocks (or blocks having at least one non-zero transform coefficient), a high-resolution picture updating unit converts corresponding blocks of a low-resolution reference picture retrieved from the low-resolution picture storage unit to obtain high-resolution block images. It then updates a high-resolution picture stored in the high-resolution picture storage unit with the obtained high-resolution block images. This updating operation is not applied on non-coded blocks. As a result, only active regions corresponding to the coded blocks are updated within the picture stored in the high-resolution picture storage unit, while the remaining part, which may possibly be static background images, is preserved without losing their high visual quality.

12 Claims, 11 Drawing Sheets

APPARATUS AND METHOD FOR CODING AND DECODING VIDEO IMAGES

BACKGROUND OF THE INVENTION

1. Field of the Invention

The present invention generally relates to video coding apparatus, video decoding apparatus, video coding methods, and video decoding methods. More particularly, the present invention relates to a video coding apparatus that performs predictive coding of digital video signals, a video decoding apparatus that reproduces original motion images from a predictive-coded video bitstream produced by the video coding apparatus, and coding and decoding methods implemented in those video coding and decoding apparatus.

2. Description of the Related Art

In the field of digital motion picture coding techniques employing hybrid coding algorithms, H.261, MPEG-1 and MPEG-2, for example, are well-acknowledged international standards. H.261 has been formulated by the International Telecommunication Union Telecommunication Standardization Sector (ITU-T), while MPEG-1 and MPEG-2 have been defined by a committee named Moving Picture Experts Group under the auspices of the International Standards Organization (ISO). Hybrid coding algorithms are actually a combination of different coding techniques, which compresses video signals by reducing their spatial and temporal redundancies in the following sequence: (1) a source picture is divided into blocks of picture elements (pels or pixels), (2) motion compensation and orthogonal transformation (e.g., discrete cosine transform) are applied independently on each block of pels, and (3) transform coefficients are quantized and then compressed with entropy coding techniques.

When a rapid motion or a full scene transition has happened during a sequence of video frames, the above-described hybrid video coder may suffer from an overwhelming amount of coded frame data exceeding a certain standard level allowed for each frame. In such a situation, the video coder will forcibly reduce the amount of coded data in an attempt to regulate it at the standard level defined by the bandwidth of communication channels used. This attempt, however, can lead to extreme degradation in video image quality and frequent frame drops, thus resulting in unacceptably poor pictures when reconstructed at the receiving ends.

To solve the above problems, a video coding system is disclosed in the Japanese Patent Application Laid-open Publication No. 7-95566 (1995), for instance. In this proposed system, the video coder reduces the resolution of input frame signals to regulate the amount of coded frame data when a full scene change or a rapid motion has been observed in the middle of a sequence of video frames. More specifically, the video coder divides a picture into blocks and estimates motion vectors of the individual blocks as parameters for motion-compensated frame prediction. It then calculates the average magnitude of the estimated motion vectors over the entire picture. Based on the average magnitude of motions, the proposed video coder determines at what picture resolution the present frame should be encoded. This decision affects the format of both source and reference pictures; they have to be converted to the determined resolution before being subjected to the coding process.

In addition to the above, another Japanese Patent Application Laid-open Publication No. 63-155896 (1988) proposes a similar video coding system which encodes video signals after converting both source and reference pictures to a lower resolution.

The reference picture serves as the basis for predictive coding/decoding of future frames. It should be noted, however, that the above-described conventional video coding systems subsample the entire area of this reference picture, when the picture resolution mode has changed from high resolution mode to low resolution mode. While efficiently reducing the coded data size, this picture format conversion causes an adverse side effect. In a videoconference, for example, most background portions of video images do not change with time, and such static portions never contribute to temporal increase in the amount of video information. Therefore, the reduction of picture resolution is unnecessary as far as the background portions are concerned. The conventional video coding devices, however, destroy the clarity of static background images by reducing the picture resolution, thus causing an intense degradation in visual quality.

SUMMARY OF THE INVENTION

Taking the above into consideration, an object of the present invention is to provide an apparatus and a method for coding and/or decoding digital video images, capable of maintaining the quality of static regions such as background images, even when the resolution of coded pictures has changed from high to low.

To accomplish the above object, according to the present invention, there is provided a video coding apparatus for performing a predictive coding of digital video input signals in conjunction with an internal picture format conversion according to a picture resolution mode that is determined by a resolution selection controller disposed as an integral part of the video coding apparatus. Here, the picture resolution mode can be either a high resolution mode or a low resolution mode.

This proposed video coding apparatus comprises the following key elements:

(a) a high-resolution picture storage unit to store a high-resolution picture that has been locally reconstructed in a high resolution format;

(b) a low-resolution picture storage unit to store a low-resolution picture that has been locally reconstructed in a low resolution format;

(c) a selective reading-out unit to selectively read out the high-resolution picture from the high-resolution picture storage unit when the high resolution mode has been selected by the resolution selection controller, or the low-resolution picture from the low-resolution picture storage unit when the low resolution mode has been selected by the resolution selection controller;

(d) a high-resolution picture updating unit to convert the low-resolution picture retrieved from the low-resolution picture storage unit into a high-resolution image when the low resolution mode is effective, and store the resultant high-resolution image into the high-resolution picture storage unit; and (e) a low-resolution picture updating unit to convert the high-resolution picture retrieved from the high-resolution picture storage unit into a low-resolution picture when the resolution selection controller has changed the picture resolution mode from the high resolution mode to the low resolution mode, and store the resultant low-resolution picture into the low-resolution picture storage unit.

Furthermore, to accomplish the above object, according to the present invention, there is provided a video decoding apparatus for receiving and decoding a predictive-coded video bitstream produced by compressing digital video input signals with a predictive coding technique in conjunction with an internal picture format conversion according to a picture resolution mode determined by a resolution selection controller.

This video decoding apparatus comprises the following key elements:

(a) a high-resolution picture storage unit for storing a high-resolution picture that has been reconstructed in a high resolution format;

(b) a low-resolution picture storage unit for storing a low-resolution picture that has been reconstructed in a low resolution format.

(c) a selective reading-out unit, responsive to the picture resolution mode that has been decoded, for selectively reading out the high-resolution picture from the high-resolution picture storage unit when a high resolution mode is effective, or reading out the low-resolution picture from the low-resolution picture storage unit when a low resolution mode is effective;

(d) a high-resolution picture updating unit for, when the decoded picture resolution mode indicates that the low resolution mode is effective, converting the low-resolution picture retrieved from the low-resolution picture storage unit to obtain high-resolution block images corresponding to coded blocks, and storing the high-resolution block images into the high-resolution picture storage unit; and (e) a low-resolution picture updating unit for converting the high-resolution picture retrieved from the high-resolution picture storage unit to obtain a low-resolution picture when the decoded picture resolution mode has changed from the high resolution mode to the low resolution mode, and storing the obtained low-resolution picture into the low-resolution picture storage unit.

The above and other objects, features and advantages of the present invention will become apparent from the following description when taken in conjunction with the accompanying drawings which illustrate several preferred embodiments of the present invention by way of example.

DESCRIPTION OF THE PREFERRED EMBODIMENTS

Several embodiments of the present invention will be described below with reference to the accompanying drawings.

Figure 1:
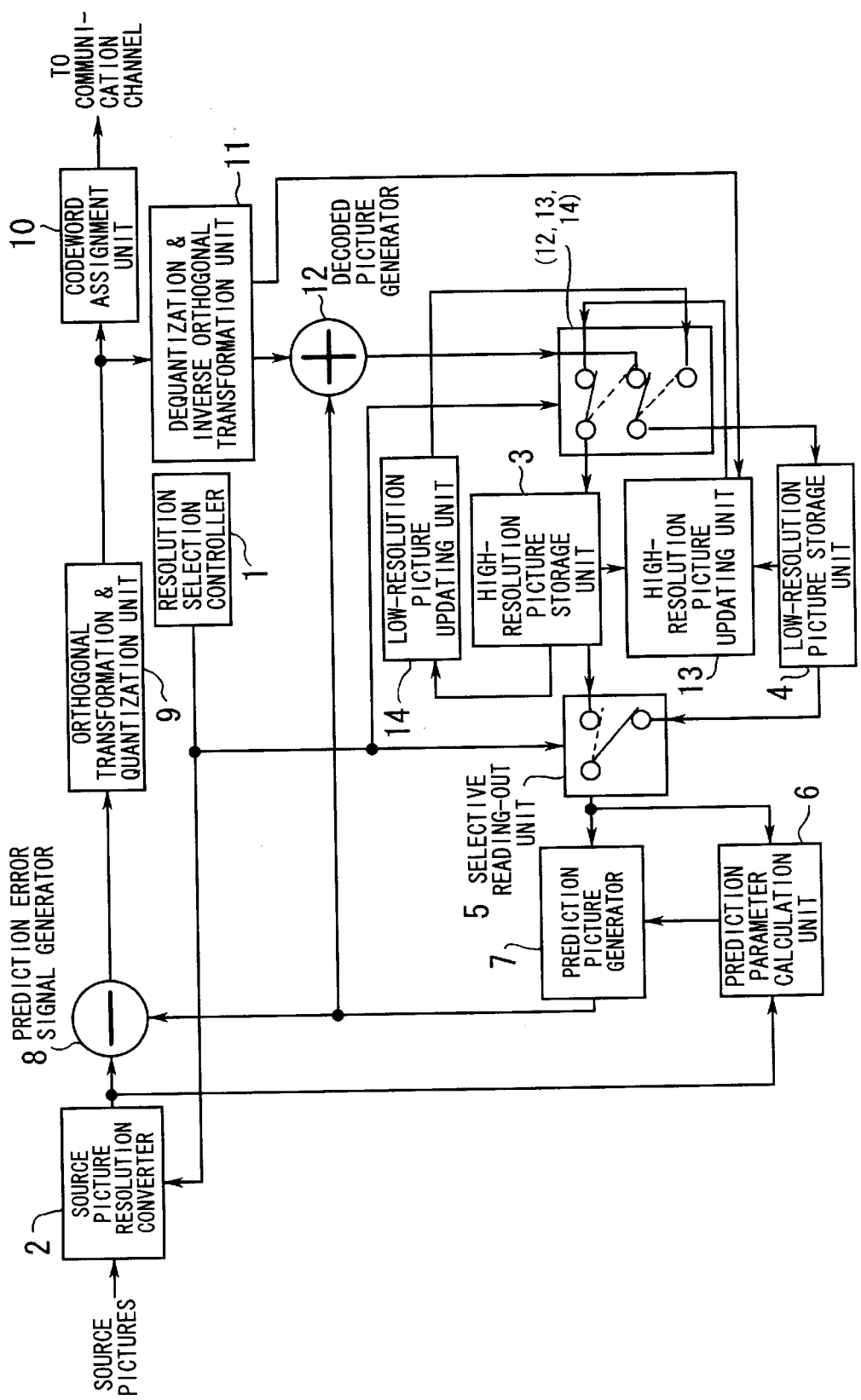
FIG. 1 is a first conceptual view of the present invention.

Referring first to FIG. 1, the concept of a first embodiment of the present invention will be explained below. This first embodiment relates to a video coder, which performs a motion-compensated predictive coding of digital video input signals in conjunction with an internal picture format conversion according to a picture resolution mode that is determined by a resolution selection controller 1. Here, the picture resolution mode can be either a high resolution mode or a low resolution mode. The video coder comprises the following key elements:

(a) a high-resolution picture storage unit 3 to store a high-resolution picture that has been locally reconstructed in a high resolution format;

(b) a low-resolution picture storage unit 4 to store a low-resolution picture that has been locally reconstructed in a low resolution format;

(c) a selective reading-out unit 5 to selectively read out the high-resolution picture from the high-resolution picture storage unit 3 when the high resolution mode has been selected by the resolution selection controller 1, or the low-resolution picture from the low-resolution picture storage unit 4 when the low resolution mode has been selected by the resolution selection controller 1;

(d) a high-resolution picture updating unit 13 to convert the low-resolution picture retrieved from the low-resolution picture storage unit 4 into a high-resolution image and then store the resultant high-resolution image into the high-resolution picture storage unit 3; and (e) a low-resolution picture updating unit 14 to convert the high-resolution picture retrieved from the high-resolution picture storage unit 3 into a low-resolution picture when the resolution selection controller 1 has changed the picture resolution mode from the high resolution mode to the low resolution mode, and store the resultant low-resolution picture into the low-resolution picture storage unit 4.

Further, the high-resolution picture updating unit 13 comprises:

(d1) a first updating unit to convert the low-resolution picture retrieved from the low-resolution picture storage unit 4 to obtain high-resolution block images corresponding only to coded blocks with non-zero motion vectors and intra-coded (i.e., intraframe coded) blocks, while the low resolution mode is effective, and store the high-resolution block images to the high-resolution picture storage unit 3, and (d2) a second updating unit to convert, while the low resolution mode is effective, a prediction error signal having been reproduced by a dequantization & inverse orthogonal transformation unit 11, to obtain a high-resolution prediction error signal corresponding only to coded blocks with zero motion vectors, reconstruct high-resolution block images by adding the high-resolution prediction error signal to corresponding blocks of the high-resolution picture retrieved from the high-resolution picture storage unit 3, and update the high-resolution picture stored in the high-resolution picture storage unit 3 with the reconstructed high-resolution block images.

The video coder of FIG. 1 further comprises the following elements: a source picture resolution converter 2, a prediction parameter calculation unit 6, a prediction picture generator 7, a prediction error signal generator 8, an orthogonal transformation & quantization unit 9, a codeword assignment unit 10, a dequantization & inverse orthogonal transformation unit 11, and a decoded picture generator 12. These elements, as well as the resolution selection controller 1, can also be seen in conventional video coding systems.

The video coder has two internal operating modes concerning picture resolutions, as mentioned earlier. The resolution selection controller 1 determines at which resolution (i.e., high resolution or low resolution) each source picture will be coded. The source picture resolution converter 2 then converts the resolution of a given source picture according to the resolution determined by the resolution selection controller 1. Here, a picture is divided into blocks having prescribed dimensions for the purpose of block motion estimation. The prediction parameter calculation unit 6 compares each block of the picture supplied from the source picture resolution converter 2 with another picture provided by the selective reading-out unit 5. Based on this comparison, the prediction parameter calculation unit 6 determines which coding scheme, intraframe coding or interframe coding, may be appropriate to each block, and then outputs a motion vector if the interframe coding scheme has been selected. The prediction picture generator 7 produces a prediction picture in a block-by-block manner, based on the output of the prediction parameter calculation unit 6. More specifically, the prediction picture generator 7 outputs zeros as the pel values of a prediction picture when the intraframe coding scheme is selected, while it constructs a prediction picture by applying the motion vectors calculated by the prediction parameter calculation unit 6 to a reference picture supplied from the selective reading-out unit 5 when the interframe coding scheme is effective.

The prediction error signal generator 8 calculates the difference between the source picture output from the source picture resolution converter 2 and the above-mentioned prediction picture to generate a prediction error signal for every predetermined block. The orthogonal transformation & quantization unit 9 performs an orthogonal transformation and quantization of the prediction error signal generated by the prediction error signal generator 8. The codeword assignment unit 10 receives, at least, the quantized prediction error signal from the orthogonal transformation & quantization unit 9, the picture resolution mode from the resolution selection controller 1, and the intra/inter coding scheme and motion vectors from the prediction parameter calculation unit 6. Out of a predefined codeword table, the codeword assignment unit 10 retrieves codewords relevant to each combination of the above received data, thereby generating a coded video bitstream. The dequantization & inverse orthogonal transformation unit 11 dequantizes the quantized prediction error signal supplied from the orthogonal transformation & quantization unit 9 and then applies an inverse orthogonal transformation to the dequantized signal, thereby reproducing the prediction error signal. The decoded picture generator 12 reconstructs a picture by summing the prediction picture and the prediction error signal reproduced by the dequantization & inverse orthogonal transformation unit 11 for each predetermined block. This reconstructed picture is referred to as a decoded picture, and it is sent to either one of two different destinations, depending on the picture resolution mode determined by the resolution selection controller 1. That is, the decoded picture is stored into the high-resolution picture storage unit 3 in the high resolution mode, or into the low-resolution picture storage unit 4 in the low resolution mode.

The following will describe more specifically the operation of the video coder configured as above. Suppose here that the resolution selection controller 1 has selected the high resolution mode for the present frame. In the high resolution mode, the source picture resolution converter 2 converts the source picture to the high resolution, and all switches shown in FIG. 1 are all set to the positions indicated by the broken lines.

In the high resolution mode, the selective reading-out unit 5 reads out the picture from the high-resolution picture storage unit 3, and sends it to the prediction parameter calculation unit 6 and prediction picture generator 7. The prediction parameter calculation unit 6 compares the high-resolution source picture supplied by the source picture resolution converter 2 with the high-resolution reference picture provided by the selective reading-out unit 5, and on the basis of this comparison, it determines which coding scheme to adopt—intraframe or interframe. If the interframe coding scheme is chosen, the prediction parameter calculation unit 6 calculates motion vectors. Note that the above process is performed independently for individual blocks constituting the picture.

The prediction picture generator 7 produces a picture according to the decision made by the prediction parameter calculation unit 6. In the case of intraframe coding, it simply outputs zeros as the pel values since the prediction picture must be blank. In the interframe coding, the prediction picture generator 7 constructs a prediction picture by applying the motion vectors calculated by the prediction parameter calculation unit 6 to the high resolution reference picture retrieved from the high-resolution picture storage unit 3 by the selective reading-out unit 5. Note again that this image prediction process is performed on an individual block basis.

The prediction error signal generator 8 calculates the difference between the high-resolution source picture supplied from the source picture resolution converter 2 and the prediction picture produced by the prediction picture generator 7 for each predetermined block, thereby yielding the displaced block difference, or prediction error signal. This prediction error signal is transformed and quantized by the orthogonal transformation & quantization unit 9, entropy-coded by the codeword assignment unit 10, and then reproduced by the dequantization & inverse orthogonal transformation unit 11, just in the same way as in a conventional video coder.

The decoded picture generator 12 produces a decoded picture by summing the prediction picture generated by the prediction picture generator 7 and the prediction error signal reproduced by the dequantization & inverse orthogonal transformation unit 11 on an individual block basis. The resultant decoded picture is then stored into the high-resolution picture storage unit 3.

Next, suppose that the resolution selection controller 1 has changed the picture resolution mode to the low resolution mode to encode the next frame. Upon transition in the picture resolution from high to low, the low-resolution picture updating unit 14 entirely converts the picture stored in the high-resolution picture storage unit 3 to the low resolution, and feeds the resultant low-resolution picture to the low-resolution picture storage unit 4.

Now that the low resolution mode is effective, the source picture resolution converter 2 reduces the resolution of a source picture, and the switches shown in FIG. 1 are all changed to the opposite positions indicated by the solid lines. Accordingly, the selective reading-out unit 5 reads the low-resolution picture out of the low-resolution picture storage unit 4, and delivers it to the prediction parameter calculation unit 6 and prediction picture generator 7.

As described above, in the present invention, the low-resolution picture storage unit 4 acquires the latest picture when the picture resolution mode is switched from high to low. The prediction parameter calculation unit 6 receives this low-resolution picture as the new reference picture through the selective reading-out unit 5, and compares it with the low-resolution source picture supplied from the source picture resolution converter 2. The prediction parameter calculation unit 6 determines the intra/inter coding scheme and calculates motion vectors in the same way as in the high resolution mode. Here, the prediction picture generator 7, prediction error signal generator 8, orthogonal transformation & quantization unit 9, the codeword assignment unit 10, and dequantization & inverse orthogonal transformation unit 11 also play their respective roles as they do in the high resolution mode.

The decoded picture generator 12 yields a picture by summing the prediction picture generated by the prediction picture generator 7 and the prediction error signal reproduced by the dequantization & inverse orthogonal transformation unit 11 for each predetermined block. The resultant decoded picture is then stored into the low-resolution picture storage unit 4. Here, the high-resolution picture updating unit 13 converts the picture stored in the low-resolution picture storage unit 4 to the high resolution—not entirely, but only for the blocks that are being "coded"—and updates the picture stored in the high-resolution picture storage unit 3 with the converted block images.

Here, it may be necessary to clarify what was meant by "coded" in the above. Recall that the coding process is applied independently on individual blocks that constitute a picture. After passing through the various process steps, blocks in the current picture are finally divided into two groups, coded blocks and non-coded blocks. The coded blocks denote such blocks that exhibit some variations when compared with the previous picture (or the reference picture), and their interframe difference components naturally cause some non-zero transform coefficients to be coded. With this definition, intra-coded blocks are also regarded as coded blocks. When reconstructed, those coded blocks will be used to update the previously used reference picture.

As opposed to the coded blocks, non-coded blocks exhibit no variations from the previous picture. Such blocks are never encoded, and thus the previous reference picture remains unchanged as far as the non-coded blocks are concerned.

When coded blocks are in process, the high-resolution picture updating unit 13 converts the resolution of corresponding blocks of the low-resolution picture retrieved from the low-resolution picture storage unit 4 to create high-resolution block images. It then updates the high-resolution picture in the high-resolution picture storage unit 3 with the created high-resolution block images. Since this picture updating operation is not performed as for the non-coded blocks, only active part corresponding to the coded blocks will be updated within the high-resolution picture, while the remaining part, which may possibly be inactive background images, is preserved as is.

The above-described functions of the high-resolution picture updating unit 13 allows the latest reference picture to be maintained in the high-resolution picture storage unit 3, even while the video coder is running in the low resolution mode. The quality of this reference picture, however, may be partly degraded to some extent because the coded blocks are updated on the basis of the low-resolution coding cycles. Although some quality degradation is introduced to active blocks, the background part of the reference picture maintains its quality without being needlessly updated.

This brings several advantages when the picture resolution mode changes from low resolution to high resolution. Upon mode transition, the picture stored in the high-resolution picture storage unit 3 begins to serve as the new reference picture for motion-compensated predictive coding. Because the quality of this reference picture has been maintained up to this point, the mode transition will not cause any picture degradation in the background part, as opposed to conventional video coders. Another advantage is the reduction of background image information to be transmitted. In conventional coders, a low-to-high resolution mode transition requires the details (i.e., high-frequency components) of background images to be coded and transmitted. The video coder proposed in the present invention eliminates the need for sending such details, thus suppressing the increase in the coded video bitstream to be transmitted over the communications channel.

To focus on the high-resolution picture updating unit 13, it comprises two functional entities, a first updating unit and a second updating unit. The first updating unit selectively processes coded blocks with non-zero motion vectors and intra-coded blocks as follows. When the resolution selection controller 1 has selected the low resolution mode, the first updating unit converts the resolution of a picture retrieved from the low-resolution picture storage unit 4 to obtain high-resolution block images. It then updates a picture stored in the high-resolution picture storage unit 3 with the obtained high-resolution block images.

The second updating unit, on the other hand, deals with coded blocks with zero motion vectors as follows. When the resolution selection controller 1 has selected the low resolution mode, the second updating unit upsamples a prediction error signal reproduced by the dequantization & inverse orthogonal transformation unit 11, thus obtaining high-resolution prediction error signal. It reconstructs a picture by adding this high-resolution prediction error signal to the high-resolution reference picture read out of the high-resolution picture storage unit 3. The second updating unit updates the picture in the high-resolution picture storage unit 3 with the resultant decoded picture.

Theoretically, blocks with no motion, such as background images, will all fall into the category of non-coded blocks. In the real world, however, there are some disturbances that affect the images of those background blocks. They include: shadows of moving human bodies, changes in size of camera's iris opening, flickers of fluorescent lamps used for interior lighting, internal and external noises, etc. Those factors are likely to cause a fluctuation in luminance, resulting in some non-zero prediction errors that have to be coded. To maintain the image quality of such background blocks as much as possible, the present invention classifies the coded blocks into "static coded blocks" and "active coded blocks." The static coded blocks are particular coded blocks having no spatial motion but exhibiting some temporal variations in luminance as mentioned above, while the active coded blocks are the coded blocks as originally defined.

The video coder of the present invention extracts active coded blocks from the present picture by testing each block as to whether it is a coded block having a non-zero motion vector, and whether it is subject to intraframe coding. The blocks that match either criterion are selectively supplied to the first updating unit in order to update the high-resolution reference picture as already explained.

The video coder also extracts static coded blocks from the present picture by examining each block as to whether it is a coded block with a zero-valued motion vector, and supplies them to the second updating unit. The second updating unit, being activated in the low resolution mode, updates the static coded blocks in the high-resolution reference picture. That is, the second updating unit converts a prediction error signal reproduced by the dequantization & inverse orthogonal transformation unit 11 to the high resolution, and reconstructs block images by adding the converted prediction error signal to corresponding blocks of the high-quality reference picture read out of the high-resolution picture storage unit 3. The reconstructed block images are used to update the contents in the high-resolution picture storage unit 3. This mechanism allows background part of the high-resolution picture to be updated without deterioration, properly following its luminance variations.

The following paragraphs provide more specific explanation about the first embodiment.

Figure 3:
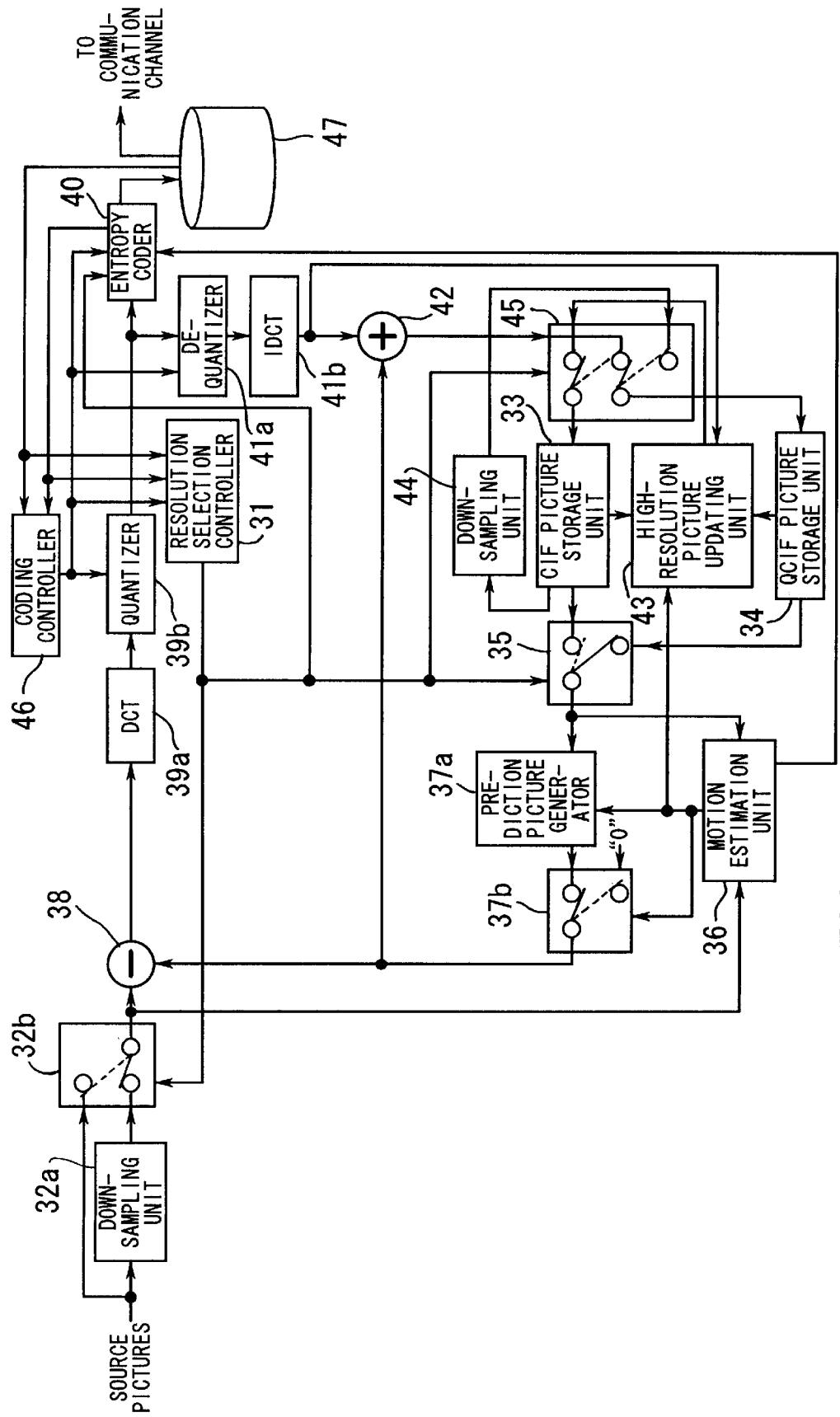
FIG. 3 is a block diagram which shows a specific configuration of a first embodiment of the present invention.

FIG. 3 is a block diagram which shows a typical video coder of the first embodiment. The elements shown in FIG. 1 are associated with those in FIG. 3 as listed below:

Resolution selection controller 1 (FIG. 1)=Resolution selection controller 31 (FIG. 3)

Source picture resolution converter 2=Downsampling unit 32a and Selection switch 32b High-resolution picture storage unit 3=CIF picture storage unit 33

Low-resolution picture storage unit 4=QCIF picture storage unit 34

Selective reading-out unit 5=Selection switch 35

Prediction parameter calculation unit 6=Motion estimation unit 36

Prediction picture generator 7=Prediction picture generator 37a and Selection switch 37b Prediction error signal generator 8=Subtractor 38

Orthogonal transformation & quantization unit 9=DCT processor 39a and Quantizer 39b Codeword assignment unit 10=Entropy coder 40

Dequantization & inverse orthogonal transformation unit 11=Dequantizer 41a and IDCT processor 41b Decoded picture generator 12=Adder 42 and Selection switch 45

High-resolution picture updating unit 13=High-resolution picture updating unit 43 and Selection switch 45

Low-resolution picture updating unit 14=Downsampling unit 44 and Selection switch 45

The acronyms used in this list denote as follows:

CIF: Common Intermediate Format

QCIF: Quarter Common Intermediate Format

DCT: Discrete Cosine Transform

IDCT: Inverse Discrete Cosine Transform

In addition to the above-listed elements, the video coder of FIG. 3 includes a coding controller 46 and a coded data buffer 47.

In operation, the resolution selection controller 31 receives quantizer step size from the coding controller 46, the amount of coded frame data from the entropy coder 40, and buffer occupancy status from the coded data buffer 47. Based on the received information, it determines the best resolution at which the video coder can transmit the video signal without excessive frame drops or quality deterioration. In this example, source pictures are supplied in a high-resolution CIF video format (352×288 pels per frame for luminance components). Another format used inside the video coder is QCIF (176×144 pels per frame for luminance components). The resolution selection controller 31 selects the high resolution (CIF) mode as the default mode, and only when the coded transmission data has exceeded the predetermined standard amount, it chooses the low resolution (QCIF) mode. There are some proposed decision-making processes for this resolution mode selection. The Japanese Patent Application No. 8-75605 (1996), for example, describes a method applicable to the present invention. In FIG. 1, the selected resolution (or resolution mode information) is distributed to the selection switches 32b, 35, and 45 and the entropy coder 40.

The downsampling unit 32a applies a 2:1 downsampling process to a high-resolution (CIF) source picture so as to create a low-resolution (QCIF) picture. The details of this downsampling process are explained below with reference to FIG. 4.

Figure 4:
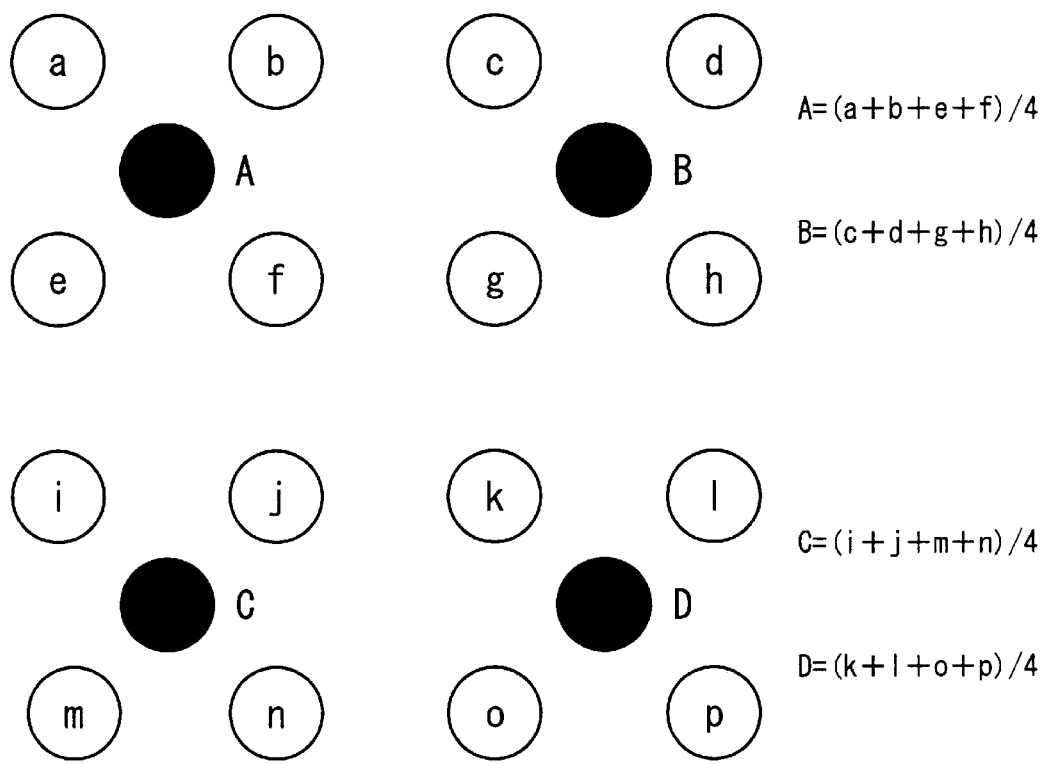
FIG. 4 is a diagram which explains a 2:1 downsampling process.

FIG. 4 depicts the 2:1 downsampling process, where white dots and lower-case alphabetic characters represent high-resolution CIF pels and their respective picture element (pel) values. Black dots and upper-case letters beside them represent low-resolution QCIF pels and their respective pel values. The downsampling process calculates the QCIF pel values A, B, C, and D by simply averaging the values of four CIF pels surrounding each QCIF pel. For example, the pel value A is obtained by $$A=(a+b+e+f)/4. \qquad (1)$$

The downward conversion from high-resolution (CIF) to low-resolution (QCIF) is achieved through such a process.

Referring back to FIG. 3, when the resolution selection controller 31 has selected the high resolution (CIF) mode, the selection switch 32b is set to the position indicated by the broken line to select high-resolution (CIF) source pictures, allowing source pictures to skip the downsampling process. On the other hand, when the resolution selection controller 31 has selected the low resolution (QCIF) mode, the selection switch 32b will be positioned as indicated by the solid line, thereby selecting low-resolution (QCIF) output pictures generated by the downsampling unit 32a.

The selection switch 35 operates according to the resolution mode indicated by the resolution selection controller 31. In the high resolution (CIF) mode, the selection switch 35 is set to the position indicated by the broken line. In the low resolution (QCIF) mode, the selection switch 35 is set to the position indicated by the solid line.

A series of video coding processes implemented in this video coder are based on the ITU-T recommendation H.261 for videoconferencing. For instance, the motion estimation unit 36 processes a picture on an individual macroblock basis. Macroblocks are defined in the H.261 standards as structural units that constitute a frame image. In this patent specification, however, they are called "blocks" for simplicity.

The motion estimation unit 36 calculates motion vectors as well as determining which to perform an intraframe coding or interframe coding. The prediction picture generator 37a constructs a prediction picture by applying the motion vectors supplied from the motion estimation unit 36 to a reference picture provided through the selection switch 35. The selection switch 37b outputs different predicted images depending on the intra/inter coding scheme that has been determined for each individual block by the motion estimation unit 36. That is, in the intraframe coding, it outputs zeros since neither motion compensation nor frame prediction takes effect in this coding scheme. On the other hand, the interframe coding makes the selection switch 37b select the prediction picture output of the prediction picture generator 37a.

The DCT processor 39a performs a discrete cosine transform (DCT) of a prediction error signal supplied thereto, thereby yielding a set of transform coefficients. The quantizer 39b quantizes the transform coefficients according to the quantizer step size sent from the coding controller 46. The resultant values are referred to as quantized coefficients.

The coding controller 46 receives information about the amount of the resultant coded data from the entropy coder 40, as well as being informed of buffer occupancy status from the coded data buffer 47. Using those two pieces of information, the coding controller 46 determines quantizer step size and distributes it to the quantizer 39b, dequantizer 41a, resolution selection controller 31, and entropy coder 40.

The entropy coder 40 receives the quantized coefficients from the quantizer 39b, the picture resolution mode from the resolution selection controller 31, the quantizer step size from the coding controller 46, and the intra/inter coding scheme and motion vectors from the motion estimation unit 36. Out of a predefined table, the entropy coder 40 retrieves codewords relevant to the individual combinations of those received data, thereby outputting the coded frame data to the coded data buffer 47. This coded data buffer 47 serves as temporary storage for the coded frame data supplied from the entropy coder 40.

The downsampling unit 44 has the same internal structure as that of the aforementioned downsampling unit 32a. The selection switch 45 is controlled in accordance with the picture resolution mode specified by the resolution selection controller 31. In the high resolution (CIF) mode, the two contacts in the selection switch 45 are both set to the positions indicated by the broken lines. In the low resolution (QCIF) mode, they are switched to the opposite positions as indicated by the solid lines. As a transitional operation, the selection switch 45 keeps a connection path from the output of the downsampling unit 44 to the QCIF picture storage unit 34 just for a short time after the resolution mode has changed from high resolution (CIF) to low resolution (QCIF). This connection path allows the QCIF picture storage unit 34 to receive the latest low-resolution (QCIF) reference picture from the downsampling unit 44 upon high-to-low transition of the resolution mode.

Referring next to FIGS. 5 to 8, the following describes how the high-resolution picture updating unit 43 and selection switch 45 operate in the present invention.

Figure 5:
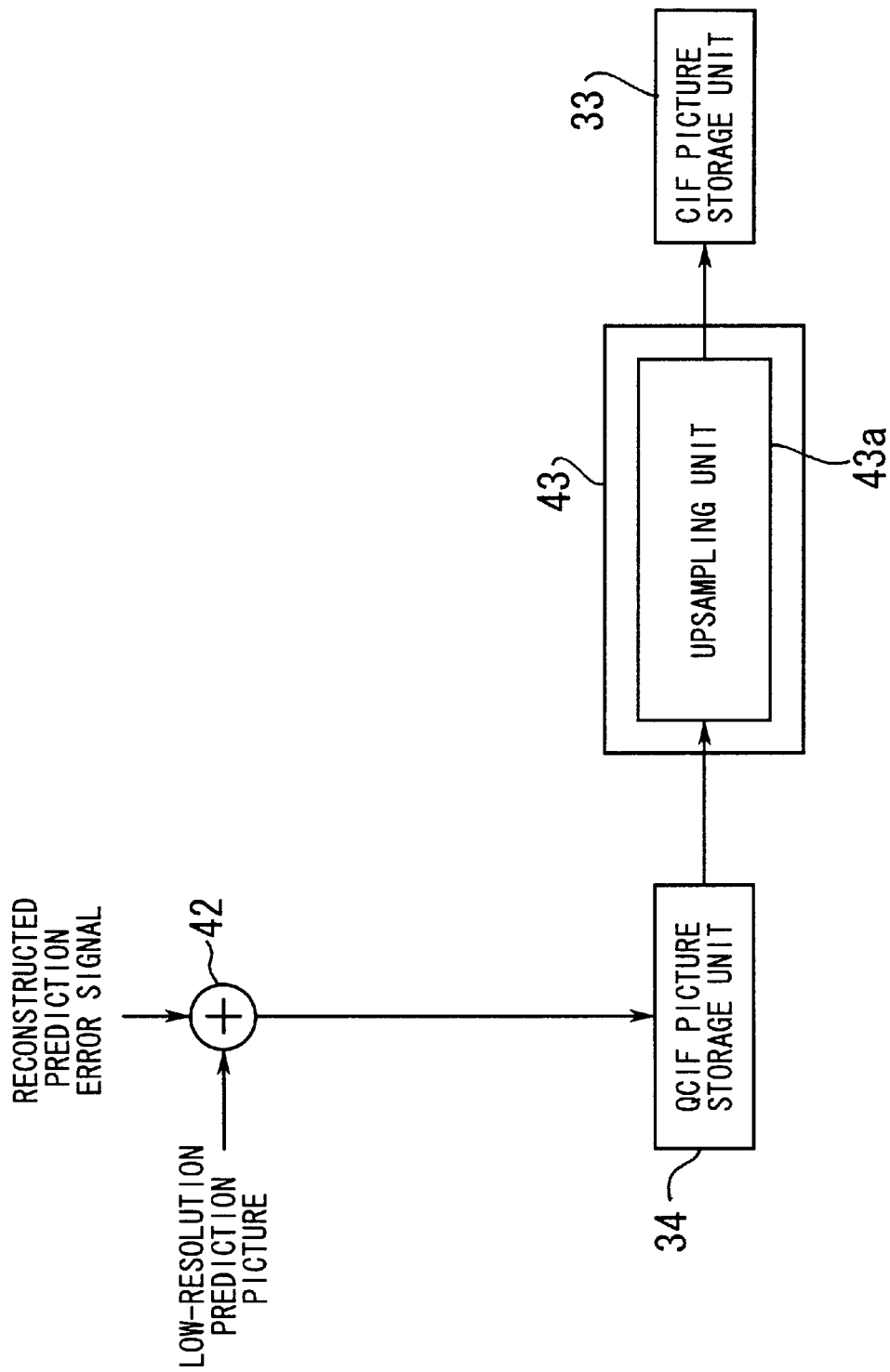
FIG. 5 is a diagram which shows how a high-resolution picture updating unit processes active coding blocks.

FIG. 5 shows how the high-resolution picture updating unit 43 processes active coded blocks. Since the system is now attempting to reconstruct a picture in the low resolution (QCIF) mode, the two contacts in the selection switch 45 have been switched to the positions as indicated by the solid lines (FIG. 3). The motion estimation unit 36 provides the high-resolution picture updating unit 43 with information about a block to be processed, including the coding scheme selected and the motion vector calculated with respect to the block of interest. On the basis of such information, the high-resolution picture updating unit 43 determines whether or not the block is an active coded block that meets either condition of: (a) a coded block with a non-zero motion vector, or (b) an intra-coded block. In the case that the block turned out to be an active coded block, the adder 42 produces a low-resolution reconstructed image of the block by summing a low-resolution error signal received from the IDCT processor 41b and a low-resolution prediction picture obtained through the selection switch 37b. The block image reconstructed as such is then supplied to the QCIF picture storage unit 34 via the selection switch 45 that is set to the position indicated by the solid lines (FIG. 3).

FIG. 7(A) illustrates a frame image saved in the QCIF picture storage unit 34. In FIG. 7(A), hatched blocks are coded blocks that exhibit some spatial motion. The non-coded blocks are static blocks such as background images. Due to the reduced resolution, any block images stored in the QCIF picture storage unit 34 are of low quality.

The high-resolution picture updating unit 43 contains an upsampling unit 43a, which applies a 1:2 upsampling process to the low-resolution (QCIF) picture in the QCIF picture storage unit 34 to produce a high-resolution (CIF) picture. The following few paragraphs focus on this upsampling process, referring to FIG. 8.

Figure 8:
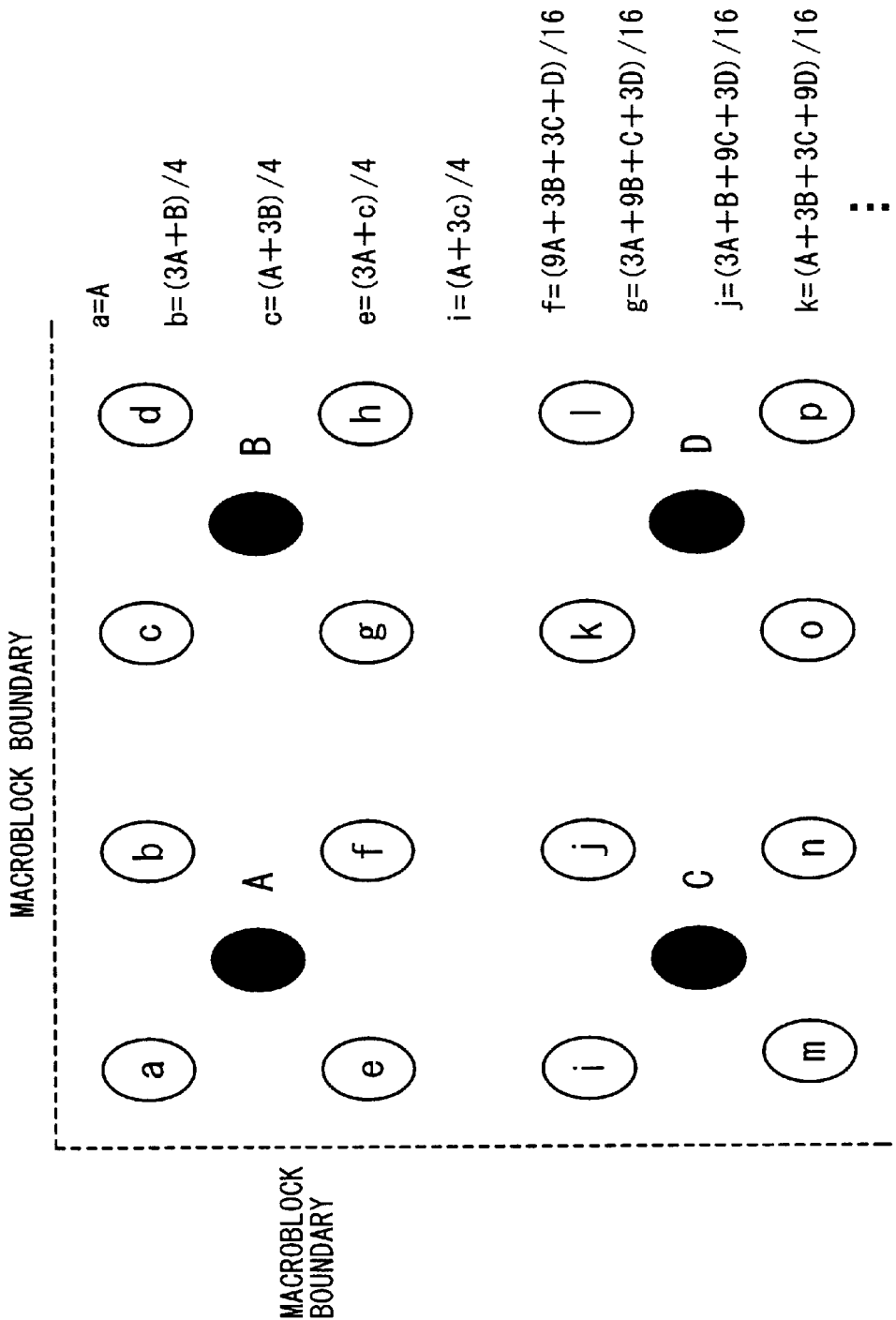
FIG. 8 is a diagram which explains a 1:2 upsampling process.

FIG. 8 shows a 1:2 upsampling process. In FIG. 8, black dots represent low-resolution (QCIF) pels, and upper-case letters beside them indicate their respective pel values, while white dots represent high-resolution (CIF) pels, and lower-case alphabetic characters placed in the dots indicate their respective pel values. The horizontal and vertical dashed lines indicate boundaries between adjacent blocks. The upsampling process obtains the values of high-resolution (CIF) pels that are not immediately adjacent to the block boundaries by calculating a weighted average of four QCIF pels surrounding each CIF pel of interest. For example, the pel value f is obtained by $$f=(9A+3B+3C+D)/16, \qquad (2)$$

where four surrounding QCIF values A to D are summed up with appropriate weighting coefficients that have been determined in accordance with their respective distances from the CIF pel of interest.

In contrast to the above, when estimating the high-resolution (CIF) pels immediately adjacent to the block boundaries, the upsampling process never refers to any pel values in the adjacent blocks, but only uses two neighboring QCIF pels within the same block. For example, the pel value b is obtained by $$b=(3A+B)/4. \qquad (3)$$

Take another pel value i for example. The upsampling unit 43a calculates it without referring to any pel values in the adjacent blocks but only considering two QCIF pel values A and C within the same block as $$i=(A+3C)/4. \qquad (4)$$

Exceptionally, CIF pels at the corners of each block are estimated directly from the nearest QCIF pel as the following example.

$$a=A \qquad (5)$$

Referring back to FIG. 5, the high-resolution picture updating unit 43 now executes the above-described upsampling process for the active coded blocks as part of the low-resolution picture retrieved from the QCIF picture storage unit 34. That is, the high-resolution picture updating unit 43 extracts active coded block from among the coded blocks shown in FIG. 7(A) and converts them into high-resolution (CIF) block images. Those high-resolution block images are then supplied to the CIF picture storage unit 33 via the selection switch 45 that has been set to the positions indicated by the solid lines (FIG. 3), thereby updating the corresponding blocks in a selective fashion.

FIG. 7(B) illustrates a frame image saved in the CIF picture storage unit 33. In FIG. 7(B), the hatched section indicates active blocks that have been updated by the high-resolution picture updating unit 43. The remaining non-updated blocks represent inactive regions such as background images. Thanks to such block updating operations, the CIF picture storage unit 33 always keeps the latest image even in the low resolution (QCIF) mode. Although the updated block images may have some quality degradation because they are based on low-resolution (QCIF) pictures, the quality of non-updated blocks is maintained at a high level.

Figure 6:
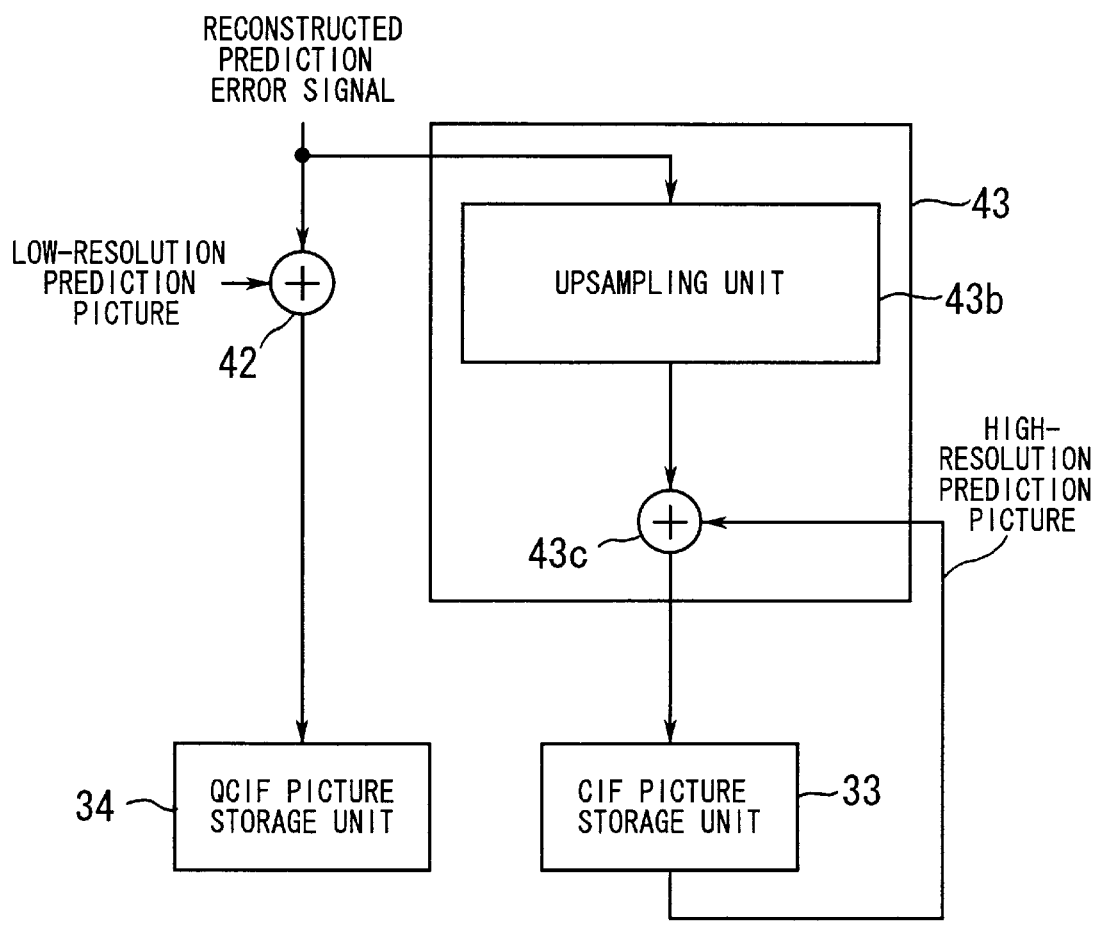
FIG. 6 is a diagram which shows how the high-resolution picture updating unit processes static coding blocks.
Figure 7:
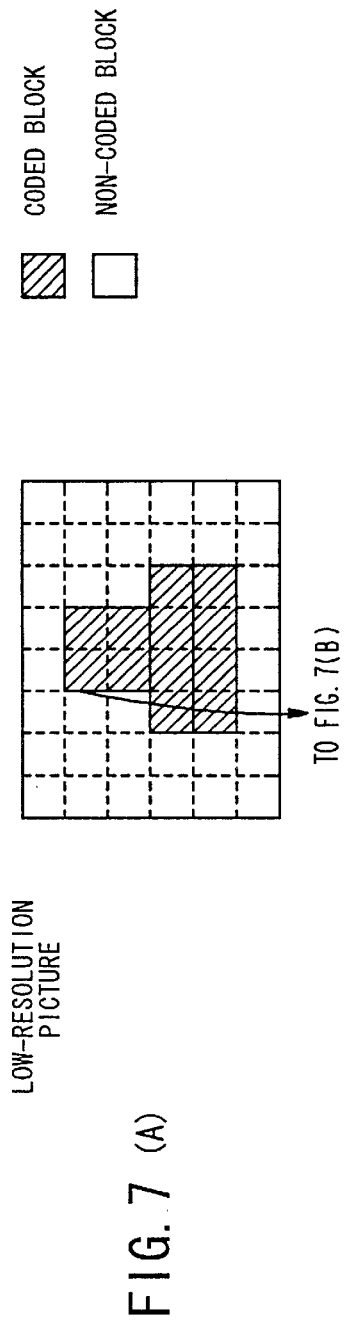
FIG. 7(A) is a diagram which illustrates a frame image saved in a QCIF picture storage unit.
FIG. 7(B) is a diagram which illustrates a frame image saved in a CIF picture storage unit.
Figure 7:
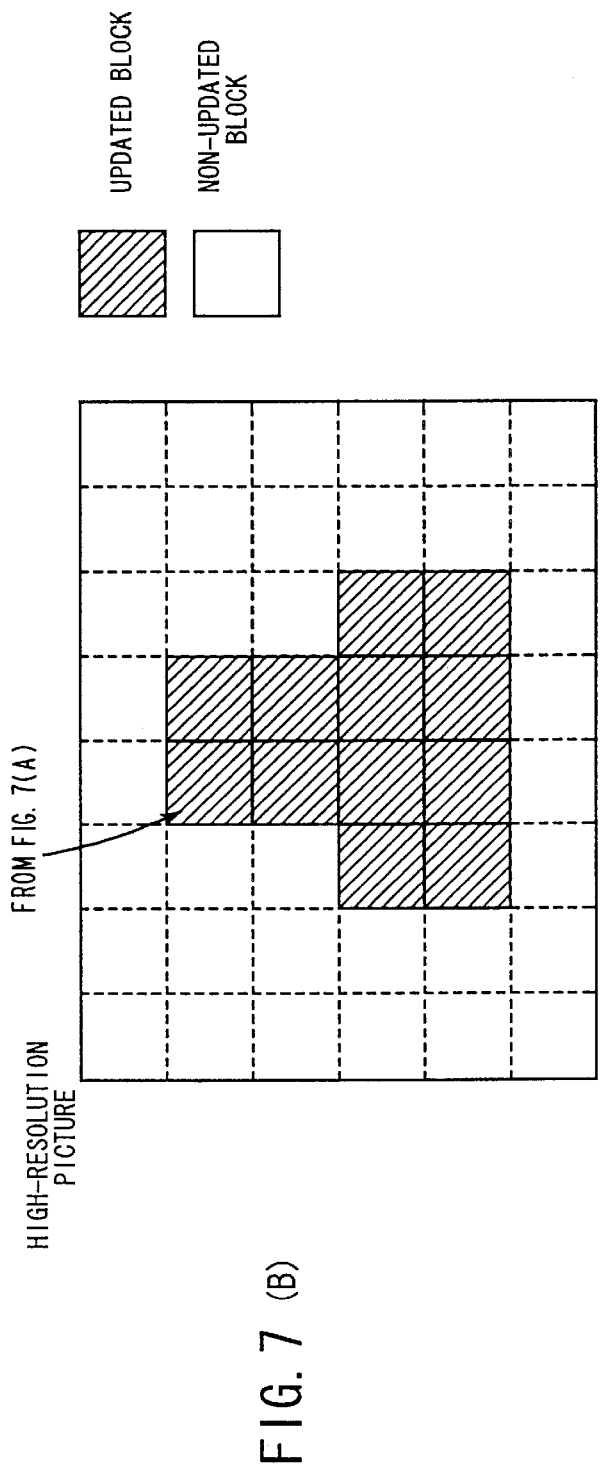

FIG. 6 shows the operation of the high-resolution picture updating unit 43 when static coded blocks are being processed. Since the system is now attempting to reconstruct a picture in the low resolution (QCIF) mode, the two contacts in the selection switch 45 are changed to the opposite positions as indicated by the solid lines (FIG. 3). The high-resolution picture updating unit 43 receives information about a block to be processed from the motion estimation unit 36. This block-specific information includes the coding scheme selected and the motion vector calculated with respect to the block of interest. On the basis of such information, the high-resolution picture updating unit 43 determines whether or not the block of interest can be regarded as a static coded block. Here, static coded blocks have at least one non-zero DCT coefficient to be coded, although their respective motion vectors are zero vectors implying no spatial displacement between frames. In the case that the block of interest is a static coded block, the adder 42 produces a low-resolution image of that block by summing a low-resolution reconstructed prediction error signal received from the IDCT processor 41b and a low-resolution prediction picture received through the selection switch 37b. The block image reconstructed as such is then supplied to the QCIF picture storage unit 34 via the selection switch 45 that is set to the positions indicated by the solid lines (FIG. 3).

As FIG. 6 shows, the high-resolution picture updating unit 43 is equipped with another upsampling unit 43b and an adder 43c, in addition to the aforementioned upsampling unit 43a. Having the same internal structure as that of the upsampling unit 43a, this second upsampling unit 43b applies a 1:2 upsampling process to the reconstructed prediction error signal to convert its resolution from low-resolution (QCIF) to high-resolution (CIF).

When a static coded block is detected by the high-resolution picture updating unit 43, the upsampling unit 43b upsamples the reconstructed prediction error signal received from the IDCT processor 41b. Subsequently, the adder 43c adds the upsampled reconstructed prediction error signal to a corresponding high-resolution (CIF) block image retrieved from the CIF picture storage unit 33, thereby obtaining a high-resolution (CIF) reconstructed block image. This reconstructed block image is then supplied to the CIF picture storage unit 33 via the selection switch 45 that has been set to the positions indicated by the solid lines (FIG. 3). A corresponding block image stored in the CIF picture storage unit 33 is replaced with that reconstructed block image with the high resolution (CIF). Thanks to such block updating operations, the CIF picture storage unit 33 always keeps the latest image even in the low resolution (QCIF) mode. Since the above-described block reconstruction scheme is based on a high-resolution (CIF) picture, the updated blocks can keep their original quality levels, while permitting temporal changes in luminance to be reflected therein.

Incidentally, a video display unit may be coupled to the CIF picture storage unit 33 for monitoring purposes. This video display unit, if available, will demonstrate improved video images whose background portions are maintained at high quality levels without being affected by any changes in the picture resolution modes.

As described above, the first embodiment of the present invention maintains the quality of inactive background images stored in the CIF picture storage unit 33 even when the picture resolution is decreased to limit the amount of coded data within a predetermined standard level. Therefore, the picture stored in the CIF picture storage unit 33, if monitored, will present clear background images even if the internal picture resolution mode has changed from high to low. This feature brings an advantage to video decoders which reconstruct video images from coded signals received from a video coder, which will be separately described later on as a second embodiment of the present invention.

Another advantage of the video coder proposed in the present invention is that it suppresses the increase in coded video data when the resolution mode has changed from low to high. In this situation, conventional video coders would produce a large amount of coded video information to regain the details of background images which have been lost during the past low-resolution coding operations. The present invention prevents this increase from happening, by maintaining a high-quality background image in the CIF picture storage unit 33 even in the low resolution mode.

Figure 9:
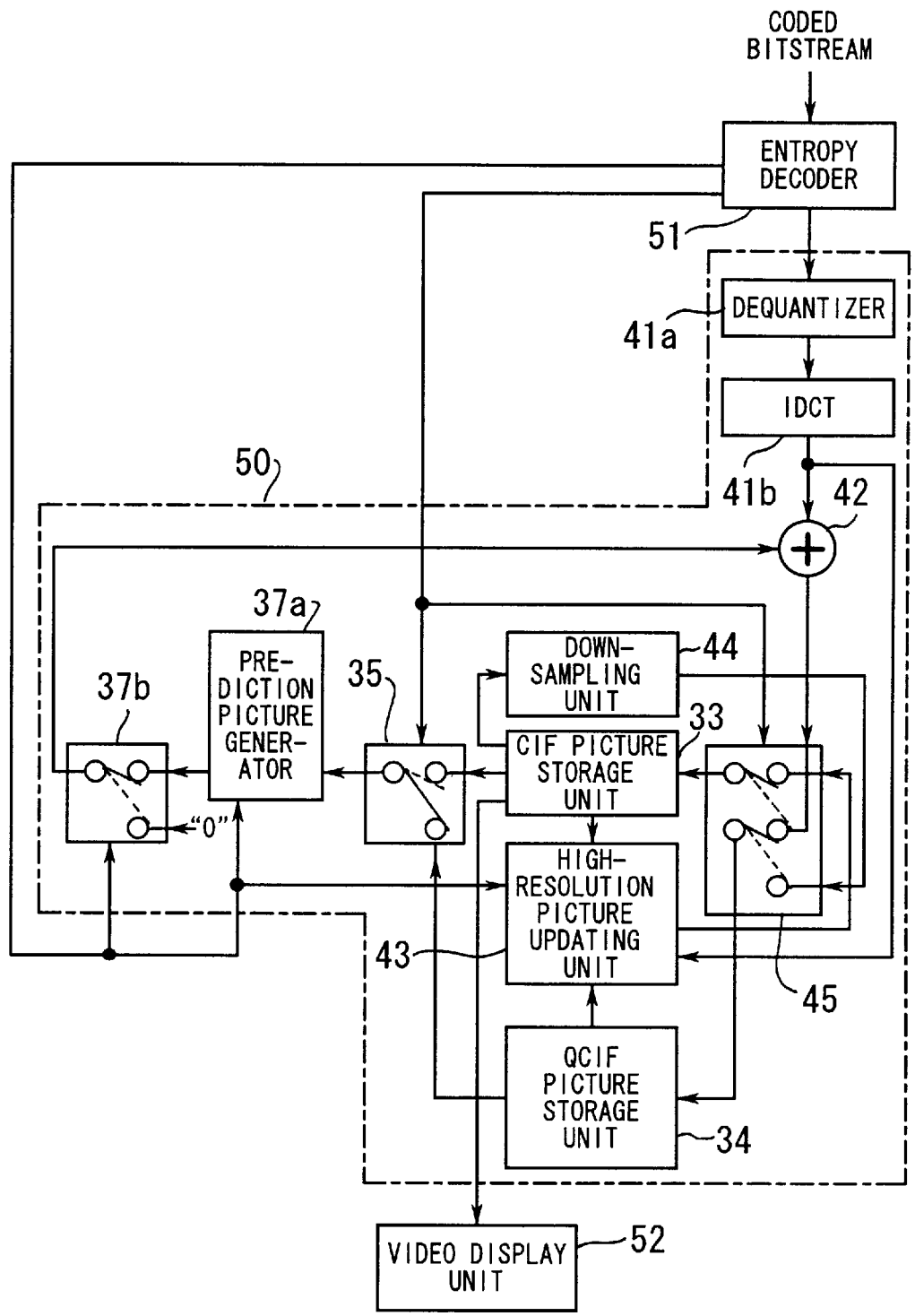
FIG. 9 is a block diagram which shows a configuration of a second embodiment of the present invention.

Next, a second embodiment of the present invention will be described below. The second embodiment of the present invention relates to a video decoder, whose configuration is shown in a block diagram of FIG. 9. Since the second embodiment is based on the concept and structure of the first embodiment, the following section will focus on its distinctive points, while affixing like reference numerals to like elements in FIG. 9.

The video decoder in the second embodiment comprises a local decoder 50 configured in the same way as the first embodiment, as well as having an entropy decoder 51 and a video display unit 52 as elements specific to video decoders. The entropy decoder 51 reproduces quantized DCT coefficients, picture resolution, quantizer step size, inter/intra coding scheme, and motion vectors, by entropy-decoding a coded bitstream received from the sending end. The entropy decoder 51 then distributes those reproduced signals to other functional blocks within the decoder system. More specifically, it sends (a) the quantized DCT coefficients and quantizer step size to the dequantizer 41a, (b) the picture resolution mode to the selection switches 35 and 45, and (c) the inter/intra coding scheme and motion vectors to the prediction picture generator 37a, selection switch 37b, and high-resolution picture updating unit 43.

The video decoder of the second embodiment receives a coded bitstream produced at the video coder discussed in the first embodiment. The local decoder 50 decodes the received bitstream, as does its counterpart in the video coder of the first embodiment. As a result, the CIF picture storage unit 33 always keeps video images with background regions maintained at high quality levels regardless of changes in the resolution modes. The video display unit 52 is configured to display such video images. Therefore, the video encoder of the second embodiment maintains the quality of inactive background images, even when the picture resolution is reduced so as to limit the amount of coded data within a predetermined standard level. The video display unit 52 will keep a clear background image even if the picture resolution mode has changed from high to low.

Figure 2:
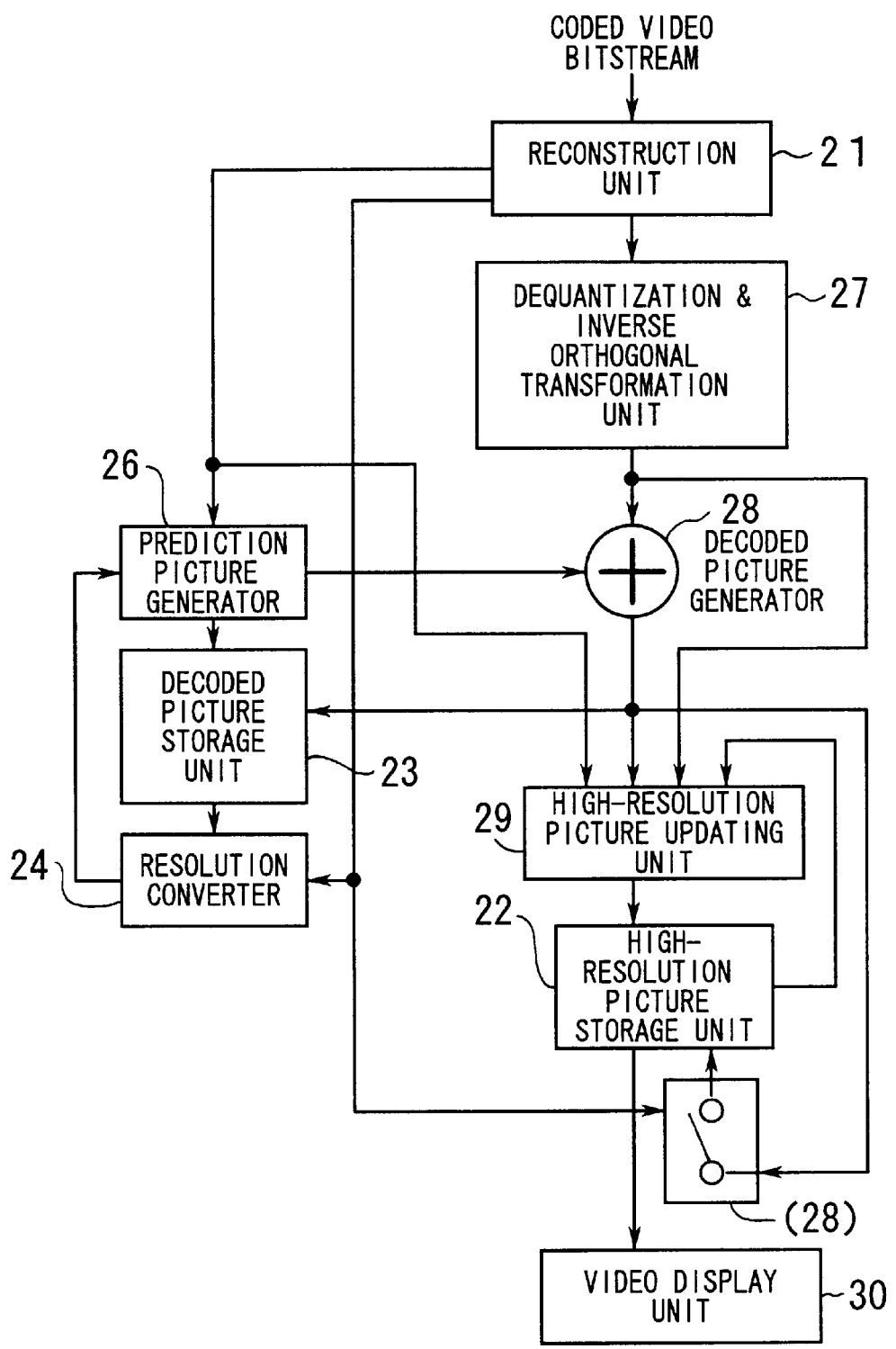
FIG. 2 is a second conceptual view of the present invention.

Next, a third embodiment of the present invention will be described below. Referring first to FIG. 2, the following section will present the concept of the third embodiment. The third embodiment relates to a video decoder, whose key elements include:

(a) a high-resolution picture storage unit 22 to store a high-resolution picture that has been reconstructed in a high resolution format;

(b) a decoded picture storage unit 23 to store a decoded picture that has been reconstructed;

(c) a decoded picture generator 28 which produces a decoded picture based on a reproduced prediction error signal, stores the decoded picture into the decoded picture storage unit 23, and additionally stores the decoded picture into the high-resolution picture storage unit 22 only when the decoded picture is of the high-resolution format; and (d) a high-resolution picture updating unit 29 which converts, when the decoded picture is of the low resolution format, only coded blocks of the decoded picture to obtain high-resolution block images corresponding to the coded blocks, and stores the high-resolution block images into the high-resolution picture storage unit 22.

The high-resolution picture updating unit 29 comprises a first updating unit and a second updating unit. The first updating unit selectively processes coded blocks with non-zero motion vectors and intra-coded blocks within a given decoded picture. When the low resolution mode is effective, this first updating unit converts the resolution of such blocks of the decoded picture to obtain high-resolution block images and then stores them to the high-resolution picture storage unit 22.

In contrast to the first updating unit, the second updating unit deals with coded blocks with zero motion vectors. When the low resolution mode is set, the second updating unit converts a prediction error signal reproduced by the dequantization & inverse orthogonal transformation unit 27 to yield a high-resolution prediction error signal, and reconstructs a picture by adding this high-resolution prediction error signal to the high-resolution picture retrieved from the high-resolution picture storage unit 22. The second updating unit updates the picture in the high-resolution picture storage unit 22 with the resultant reconstructed picture.

The video decoder proposed in the third embodiment achieves the object of the present invention by only introducing some additional circuits to a conventional video decoder. Actually, most elements illustrated in FIG. 2 are often seen in conventional decoder devices. Such conventional elements include the reconstruction unit 21, decoded picture storage unit 23, resolution converter 24, prediction picture generator 26, dequantization & inverse orthogonal transformation unit 27, decoded picture generator 28, and video display unit 30. In operation, the decoded picture storage unit 23 stores the decoded picture received from the decoded picture generator 28, no matter what resolution it may have. The resolution converter 24 converts the reference picture stored in the decoded picture storage unit 23, according to the resolution mode indicated by the reconstruction unit 21, and sends the converted reference picture to the prediction picture generator 26.

More specifically, when the high resolution mode is indicated by the reconstruction unit 21, the resolution converter 24 examines the resolution of the reference picture stored in the decoded picture storage unit 23. If it is a high-resolution picture, the resolution converter 24 sends the reference picture to the prediction picture generator 26 without modification. If it is a low-resolution picture, the resolution converter 24 converts it to the high resolution and sends the resultant high-resolution reference picture to the prediction picture generator 26. In turn, when the low resolution is indicated by the reconstruction unit 21, the resolution converter 24 examines the resolution of the reference picture stored in the decoded picture storage unit 23. If it is a low-resolution picture, the resolution converter 24 sends the reference picture to the prediction picture generator 26 without modification. If it is a high-resolution picture, the resolution converter 24 converts it to the low resolution and sends the resultant low-resolution picture to the prediction picture generator 26.

The prediction picture generator 26 generates a prediction picture on an individual block basis, according to the intra/inter coding schemes reproduced by the reconstruction unit 21. More specifically, when a given block is an intra-coded block, the prediction picture generator 7 outputs zeros for the pel values of a prediction picture. In turn, when the block is a block coded by interframe prediction, the prediction picture generator 26 constructs a prediction picture by applying a corresponding motion vector reproduced by the reconstruction unit 21 to the reference picture supplied from the resolution converter 24.

The prediction picture generated in either way is then supplied to the decoded picture generator 28. The decoded picture generator 28 calculates the sum of the prediction picture received from the prediction picture generator 26 and the prediction error signal reproduced by the dequantization & inverse orthogonal transformation unit 27 on an individual block basis. The resultant decoded picture is then stored into the decoded picture storage unit 23. It should be added here that the reproduced prediction error signal and the reference picture are consistent with the picture resolution mode reproduced by the reconstruction unit 21.

What have been described above are conventional decoding functions. The following paragraphs will describe the operation of the video coder, particularly about several elements that are newly introduced in the present invention.

As mentioned earlier, one of the objects of the present invention is to provide viewers with high-resolution video images for at least inactive portions such as background images, even in the situation that the system has to work in a low resolution mode. On the other hand, there exists a compatibility issue that requires the video decoder to employ a conventional decoder loop consisting of the decoded picture storage unit 23, resolution converter 24, prediction picture generator 26, and decoded picture generator 28. This decoder loop has to work just in the same way as the local decoder loop works at the encoding end. To meet this requirement, the decoder loop is configured to operate as follows.

When the resolution mode reproduced by the reconstruction unit 21 has changed from low to high, the resolution converter 24 converts the low-resolution picture retrieved from the decoded picture storage unit 23 into a high-resolution picture and sends it to the prediction picture generator 26. The prediction picture generator 26 then produces a prediction picture. The decoded picture generator 28 constructs a decoded picture from the prediction picture and stores this high-resolution decoded picture into the decoded picture storage unit 23. At the same time, the decoded picture is also supplied to the high-resolution picture storage unit 22 via a switch (28) illustrated in FIG.

2. After the transition to the high resolution mode, high-resolution pictures are continuously supplied from the decoded picture storage unit 23 to the prediction picture generator 26, as long as the reconstruction unit 21 keeps indicating the same high resolution mode.

When, in turn, the resolution mode has reversely changed from high to low, the resolution converter 24 converts the high-resolution picture retrieved from the decoded picture storage unit 23 to a low-resolution picture and sends it to the prediction picture generator 26. As a result, a low-resolution decoded picture is stored in the decoded picture storage unit 23. After this transition to the low resolution mode, low-resolution pictures are continuously supplied from the decoded picture storage unit 23 to the prediction picture generator 26, as long as the reconstruction unit 21 keeps indicating the same low resolution mode.

In parallel with the above-described decoder loop, the high-resolution picture storage unit 22 and high-resolution picture updating unit 29 play their unique roles in the following manner. In the low resolution mode, the high-resolution picture updating unit 29 selectively converts coded blocks in a decoded picture provided from the decoded picture generator 28 to raise their resolution. With the resultant high-resolution block images, it then updates the picture stored in the high-resolution picture storage unit 22. As a result of this block-based updating operation, only an active part corresponding to the coded blocks is changed within the picture stored in the high-resolution picture storage unit 22, while the remaining part, which may possibly be a static background image, is kept as is, without losing its high visual quality. The video decoder of FIG. 2 uses the high-resolution picture storage unit 22 as the signal source for the video display unit 30. This video display unit 30 will demonstrate improved video images with high-quality background portions without being affected by any changes in the resolution modes.

To accomplish the above functions, the high-resolution resolution picture updating unit 29 comprises the first and second updating units. No further details of those two units are presented here again, because their functions are the same as those of the high-resolution picture updating unit 13 (FIG. 1) in the first embodiment.

Next, the following section will give a further explanation about the third embodiment of the present invention by showing a more specific implementation.

Figure 10:
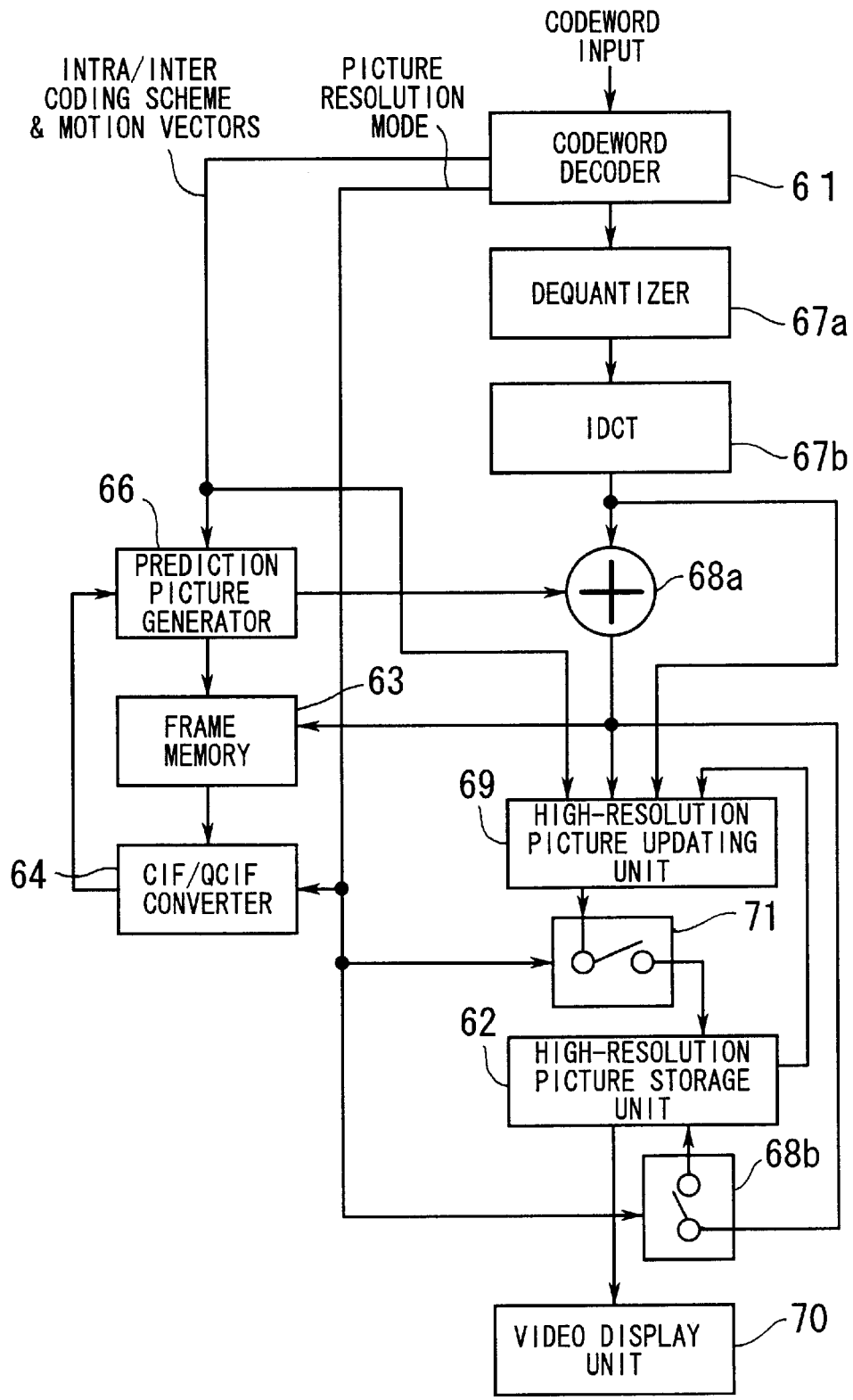
FIG. 10 is a block diagram which shows a specific configuration of a third embodiment of the present invention.

FIG. 10 is a block diagram which shows a specific configuration of the third embodiment. The elements described in the conceptual view of FIG. 2 are associated with the components shown in FIG. 10 as listed below:

Reconstruction unit 21 (FIG. 2)=Codeword decoder 61 (FIG. 10)

High-resolution picture storage unit 22=High-resolution picture storage unit 62

Decoded picture storage unit 23=Frame memory 63

Resolution converter 24=CIF/QCIF converter 64

Prediction picture generator 26=Prediction picture generator 66

Dequantization & inverse orthogonal transformation unit 27=Dequantizer 67a and IDCT processor 67b Decoded picture generator 28=Adder 68a and switch 68b High-resolution picture updating unit 29=High-resolution picture updating unit 69 and Switch 71

Video display unit 30=Video display unit 70

The codeword decoder 61 reproduces quantized DCT coefficients, picture resolution mode, quantizer step size, interframe/intraframe coding scheme, and motion vectors, by decoding a coded video bitstream received from the sending end. It then delivers the quantized DCT coefficients and quantizer step size to the dequantizer 67a, the picture resolution mode to the switches 68b and 71 and CIF/QCIF converter 64, and the interframe/intraframe coding scheme and motion vectors to the prediction picture generator 66 and high-resolution picture updating unit 69.

The CIF/QCIF converter 64 converts the resolution of a picture read out of the frame memory 63 to give the resolution specified by the codeword decoder 61 regardless of its original resolution. More specifically, when the high resolution (CIF) mode is specified, the CIF/QCIF converter 64 upsamples the picture so that it will have the high resolution (CIF) as specified. When the low resolution (QCIF) mode is specified, the CIF/QCIF converter 64 downsamples the picture so that it will have the low resolution (QCIF).

The switch 68b is closed only when the codeword decoder 61 has specified the high resolution (CIF) mode. Through this data path, a high-resolution (CIF) decoded picture is transferred block by block to the high-resolution picture storage unit 62, every time it is produced by the adder 68a. Therefore, the high-resolution picture storage unit 62 holds the latest decoded picture of high resolution (CIF) as long as the decoding process is performed in the high resolution (CIF) mode. In contrast to this, the low resolution (QCIF) mode requires the high-resolution picture storage unit 62 and related circuits to perform more complex operations. The next section will describe how the decoded picture is controlled in the low resolution mode.

Figure 11:
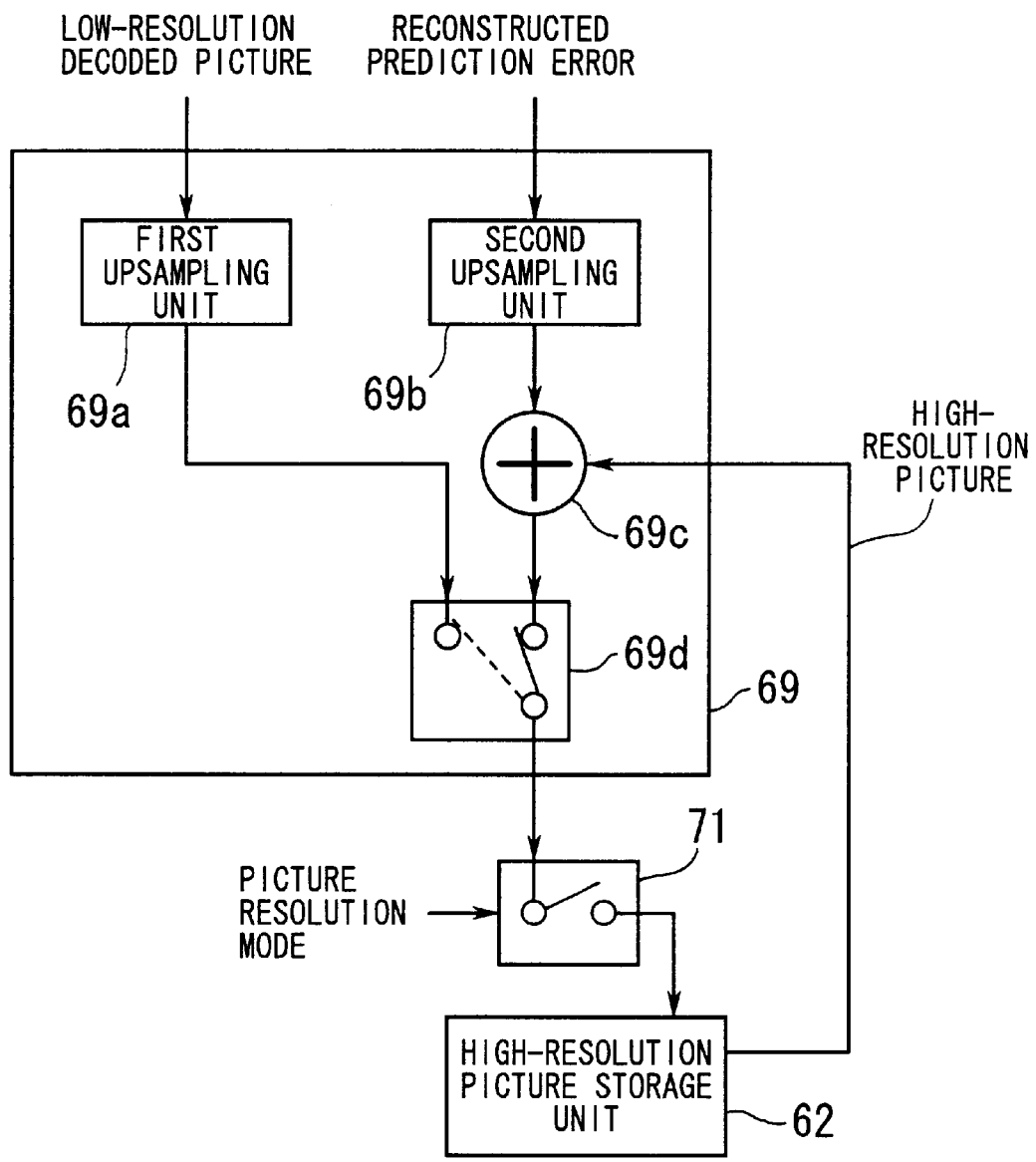
FIG. 11 is a diagram which shows the internal structure of a high-resolution picture updating unit.

FIG. 11 shows the internal structure of the high-resolution picture updating unit 69. The high-resolution picture updating unit 69 comprises two upsampling units 69a and 69b, an adder 69c, and a selection switch 69d. The upsampling units 69a and 69b execute upsampling processes in the same way as explained in the first embodiment (FIG. 8). The selection switch 69d is controlled in accordance with the intra/inter coding schemes and motion vectors received from the codeword decoder 61. More specifically, the high-resolution picture updating unit 69 determines whether each given block is an active coded block or a static coded block, by checking the coding schemes and motion vectors. If the block of interest has turned out to be an active coded block, the selection switch 69d will be set to a position as indicated by the broken line in FIG. 11. If the block is recognized as a static coded block, the selection switch 69d will be set to the other position as indicated by the solid line in FIG. 11. In this context, the terms "active coded block" and "static coded block" are used in the same meanings as defined in the first embodiment.

A switch 71 is responsive to the resolution mode decoded by the codeword decoder 61, which allows the high-resolution picture updating unit 69 to send its output to the high-resolution picture storage unit 62 only in the low resolution (QCIF) mode.

While the low resolution (QCIF) mode is effective, the circuit of FIG. 11 operates as follows. When the block of interest is found to be an active coded block, the contact of the selection switch 69d is set to the position as indicated by the broken line in FIG. 11. Inside the high-resolution picture updating unit 69, the first upsampling unit 69a upsamples the low-resolution (QCIF) decoded picture sent from the adder 68a, to create a high-resolution (CIF) block image, and delivers it to the high-resolution picture storage unit 62 via the selection switch 69d. This high-resolution block image replaces the corresponding block of the picture stored in the high-resolution picture storage unit 62.

The above-described updating process permits the high-resolution picture storage unit 62 to have the latest picture even when the decoder loop has been working in the low resolution (QCIF) mode. Although the updated blocks may be degraded to some extent because their source is low resolution (QCIF) pictures, the remaining non-updated blocks will keep their visual quality.

Now imagine that the block of interest is found to be a static coded block. Then the contact of the selection switch 69d will be moved to the opposite side as indicated by the solid line in FIG. 11. Inside the high-resolution picture updating unit 69, the second upsampling unit 69b applies an upsampling process to convert the reconstructed prediction error signal supplied from the IDCT processor 67b, thus producing a high-resolution (CIF) version of the reconstructed prediction error signal. Subsequently, the adder 69c adds the upsampled reconstructed prediction error signal to a corresponding high-resolution (CIF) block image retrieved from the high-resolution picture storage unit 62 so as to obtain a high-resolution (CIF) reconstructed block image. This block image is then fed back to the high-resolution picture storage unit 62 via the selection switch 69d and the switch 71. A corresponding block image stored in the high-resolution picture storage unit 62 is now replaced with that new block image having the high resolution (CIF). Such updating process permits the high-resolution picture storage unit 62 to keep the latest picture even while the main decoder loop is working in the low resolution (QCIF) mode. Because the above-described block updating operations are based on a high-resolution (CIF) picture, the updated blocks can keep their original quality levels, as well as permitting temporal changes in luminance to be properly reflected.

Consequently, the background portions of video images in the high-resolution picture storage unit 62 are preserved at high quality levels, regardless of the resolution modes. The video decoder of FIG. 10 uses this high-resolution picture storage unit 62 as the signal source for the video display unit 70. Although the picture resolution may be reduced at the sending end to regulate the amount of video transmission data within a predetermined standard level, the video display unit 70 provides clear video images whose inactive background portions are maintained at high quality levels, without being affected by reduction of the picture resolution.

Besides succeeding to the basic structure of a conventional decoder loop, the video decoder according to the third embodiment accomplishes the primary object of the present invention by simply introducing a few additional circuits, such as the high-resolution picture storage unit 62, high-resolution picture updating unit 69, switch 71, and selection switch 68b.

The above discussion is now summarized below. As important features of the present invention, the proposed video coder comprises a high-resolution picture storage unit, low resolution picture storage unit, high-resolution picture updating unit, and low-resolution picture updating unit. These units maintain the quality of inactive regions of a picture, such as background images, preventing them from being degraded when the resolution mode has changed from high to low.

In conventional coders, a low-to-high transition in the resolution mode invokes retransmission of detailed visual information of background images. The video coder proposed in the present invention, however, eliminates the need for sending such details, thus suppressing unwanted increase in size of coded data transmitted over the communications channel.

The proposed video coder classifies coded blocks into active coded blocks and static coded blocks, and maintains the resolution and quality of the static coded blocks. This enables appropriate processes to be applied to such coded blocks that have some luminance change but no spatial motion.

Furthermore, the proposed video decoder prevents degradation in picture qualities from happening to inactive regions of a picture, such as background images, when the resolution mode has changed from high to low. The present invention accomplishes this by simply introducing a high-resolution picture storage unit and a high-resolution picture updating unit, besides exploiting a conventional decoder loop configuration.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A video coding apparatus for performing a predictive coding of digital video input signals in conjunction with an internal picture format conversion according to a picture resolution mode, which is either a high resolution mode or a low resolution mode determined by a resolution selection controller disposed as an integral part of the video coding apparatus, the video coding apparatus comprising:

(a) high-resolution picture storage means for storing a high-resolution picture that has been locally reconstructed in a high resolution format;

(b) low-resolution picture storage means for storing a low-resolution picture that has been locally reconstructed in a low resolution format;

(c) selective reading-out means for selectively reading out the high-resolution picture from said high-resolution picture storage means when the high resolution mode has been selected by the resolution selection controller, or the low-resolution picture from said low-resolution picture storage means when the low resolution mode has been selected by the resolution selection controller;

(d) high-resolution picture updating means for converting the low-resolution picture retrieved from said low-resolution picture storing means into a high-resolution image when the low resolution mode is effective, and storing the resultant high-resolution image into said high-resolution picture storage means; and (e) low-resolution picture updating means for converting the high-resolution picture retrieved from said high-resolution picture storage means into a low-resolution picture when the resolution selection controller has changed the picture resolution mode from the high resolution mode to the low resolution mode, and storing the resultant low-resolution picture into said low-resolution picture storage means.

2. The video coding apparatus according to claim 1, wherein the video coding apparatus has transform, quantization, dequantization, inverse transform, and motion compensation functions, and said high-resolution picture updating means comprises:

(d1) first updating means for converting the low-resolution picture retrieved from said low-resolution picture storage means to obtain high-resolution block images corresponding to coded blocks with non-zero motion vectors and intra-coded blocks while the low resolution mode is effective, and storing the high-resolution block images to said high-resolution picture storage means, and (d2) second updating means for converting, while the low resolution mode is effective, a prediction error signal having been reproduced by using the dequantization and inverse transform functions, to obtain a high-resolution prediction error signal corresponding to coded blocks with zero motion vectors, reconstructing high-resolution block images by adding the high-resolution prediction error signal to corresponding blocks of the high-resolution picture retrieved from the high-resolution picture storage means, and updating the high-resolution picture stored in the high-resolution picture storage means with the reconstructed high-resolution block images.

3. A video decoding apparatus for receiving and decoding a predictive-coded video bitstream, produced by compressing digital video input signals with a predictive coding technique in conjunction with an internal picture format conversion according to a picture resolution mode, the video decoding apparatus comprising:

(a) high-resolution picture storage means for storing a high-resolution picture that has been reconstructed in a high resolution format;

(b) low-resolution picture storage means for storing a low-resolution picture that has been reconstructed in a low resolution format;

(c) selective reading-out means, responsive to the picture resolution mode, for selectively reading out the high-resolution picture from said high-resolution picture storage means when a high resolution mode is effective, or the low-resolution picture from said low-resolution picture storage means when a low resolution mode is effective;

(d) high-resolution picture updating means for, when the picture resolution mode indicates that the low resolution mode is effective, converting the low-resolution picture retrieved from said low-resolution picture storage means to obtain high-resolution block images corresponding to coded blocks, and storing the high-resolution block images into said high-resolution picture storage means; and (e) low-resolution picture updating means for converting the high-resolution picture retrieved from said high-resolution picture storage means to obtain a low-resolution picture when the picture resolution mode has changed from the high resolution mode to the low resolution mode, and storing the obtained low-resolution picture into said low-resolution picture storage means.

4. The video decoding apparatus according to claim 3, wherein said high-resolution picture updating means comprises:

(d1) first updating means for converting the low-resolution picture retrieved from said low-resolution picture storage means to obtain high-resolution block images corresponding to coded blocks with non-zero motion vectors and intra-coded blocks while the low resolution mode is effective, and storing the high-resolution block images to the high-resolution picture storage means, and (d2) second updating means for converting, while the low resolution mode is effective, a prediction error signal having been reproduced by dequantization and inverse transform functions, to obtain a high-resolution prediction error signal corresponding to coded blocks with zero motion vectors, reconstructing high-resolution block images by adding the high-resolution prediction error signal to corresponding blocks of the high-resolution picture retrieved from the high-resolution picture storage means, and updating the high-resolution picture stored in the high-resolution picture storage means with the reconstructed high-resolution block images.

5. A video decoding apparatus for receiving and decoding a predictive-coded video bitstream produced by compressing digital video input signals with a predictive coding technique in conjunction with an internal picture format conversion according to a picture resolution mode determined by a resolution selection controller, the video decoding apparatus comprising:

(a) high-resolution picture storage means for storing a high-resolution picture that has been reconstructed in a high resolution format;

(b) decoded picture storage means for storing a decoded picture that has been reconstructed;

(c) decoded picture generating means for producing the decoded picture based on a reproduced prediction error signal, storing the decoded picture into said decoded picture storage means, and additionally storing the decoded picture into said high-resolution picture storage means only when the decoded picture is of the high resolution format; and (d) high-resolution picture updating means for, when the decoded picture is of a low resolution format, selectively converting coded blocks of the decoded picture to obtain high-resolution block images of the coded blocks, and storing the obtained high-resolution block images into said high-resolution picture storage means.

6. The video decoding apparatus according to claim 5, wherein said high-resolution picture updating means comprises:

(d1) first updating means for converting the decoded picture supplied from said decoded picture generating means to obtain high-resolution block images corresponding to coded blocks with non-zero motion vectors and intra-coded blocks when the decoded picture is of the low resolution format, and storing the high-resolution block images to the high resolution picture storage means, and (d2) second updating means for, when the decoded picture is of the low resolution format, converting a prediction error signal having been reproduced by dequantization and inverse transform functions, to obtain a high-resolution prediction error signal corresponding to coded blocks with zero motion vectors, reconstructing high-resolution block images by adding the high-resolution prediction error signal to corresponding blocks of the high-resolution picture retrieved from said high-resolution picture storage means, and updating the high-resolution picture stored in said high-resolution picture storage means with the reconstructed high-resolution block images.

7. A video coding method for predictively coding a video input signal, which is implemented in a video coding apparatus having a high-resolution picture storage unit and a low resolution picture storage unit, the video coding method comprising the steps of:

(S1) storing a decoded picture that has been locally reconstructed in a previous frame into the high-resolution picture storage unit if the decoded picture is a high-resolution picture, or storing the decoded picture to the low-resolution picture storage unit if the decoded picture is a low-resolution picture;

(S2) determining which picture resolution mode, a high resolution mode or a low resolution mode, is to be used to encode the video input signal in a present frame;

(S3) reading out the high-resolution picture from the high-resolution picture storage unit when the high resolution mode has been selected in said step (S2), or reading out the low-resolution picture from the low-resolution picture storage unit when the low resolution mode has been selected in said step (S2);

(S4) obtaining a decoded picture of the present frame by adding a prediction error signal to a prediction picture constructed from the high-resolution picture or the low-resolution picture read out in said step (S3), and storing the obtained decoded picture into the high-resolution picture storage unit when the high resolution mode has been selected in the step (S2), or into the low-resolution picture storage unit when the low resolution mode has been selected in the step (S2);

(S5) converting the low-resolution picture retrieved from the low-resolution picture storage unit to obtain high-resolution block images corresponding to coded blocks when the low resolution mode has been selected in the step (S2), and storing the high-resolution block images to the high-resolution picture storage unit;

(S6) converting the high-resolution picture retrieved from the high-resolution picture storage unit into a low-resolution picture when the picture resolution mode determined in the step (S2) has changed from the high resolution mode to the low resolution mode, and storing the low-resolution picture into the low-resolution picture storage unit.

8. The video coding method according to claim 7, wherein said step (S5) comprises the substeps of:

(S5a) when the low resolution mode has been selected in the step (S2), converting the low-resolution picture retrieved from the low-resolution picture storage unit to obtain high-resolution block images corresponding to coded blocks with non-zero motion vectors and intra-coded blocks, and storing the high-resolution block images to the high-resolution picture storage unit, and (S5b) when that the low resolution mode has been selected in the step (S2), converting a prediction error signal having been reproduced by using dequantization and inverse transform functions, to obtain a high-resolution prediction error signal corresponding to coded blocks with zero motion vectors, reconstructing high-resolution block images by adding the high-resolution prediction error signal to corresponding blocks of the high-resolution picture retrieved from the high-resolution picture storage unit, and updating the high-resolution picture stored in the high-resolution picture storage unit with the reconstructed high-resolution block images.

9. A video decoding method for receiving and decoding a predictive-coded video bitstream, which is implemented in a video decoding apparatus having a high-resolution picture storage unit and a low resolution picture storage unit, the video decoding method comprising the steps of:

(S1) storing a decoded picture that has been reconstructed in a previous frame into the high-resolution picture storage unit if the decoded picture is a high-resolution picture, or storing the decoded picture to the low-resolution picture storage unit if the decoded picture is a low-resolution picture;

(S2) decoding a picture resolution mode that indicates which of a low resolution mode and a high resolution mode is effective for decoding the present frame, and selectively reading out the high-resolution picture from the high-resolution picture storage unit when the high resolution mode is effective, or the low-resolution picture from the low-resolution picture storage unit when the low resolution mode is effective;

(S3) converting the low-resolution picture retrieved from the low-resolution picture storage unit to obtain high-resolution block images corresponding to coded blocks when the low resolution mode is effective, and storing the high-resolution block images to the high-resolution picture storage unit; and (S4) if the picture resolution mode has changed from the high resolution mode to the low resolution mode, converting the high-resolution picture retrieved from the high-resolution picture storage unit into a low-resolution image and storing the low-resolution image into the low-resolution picture storage unit.

10. The video decoding method according to claim 9, wherein said step (S3) comprises the substeps of:

(S3a) when the low resolution mode is effective, converting the low-resolution picture retrieved from the low-resolution picture storage unit to obtain high-resolution block images corresponding to coded blocks with non-zero motion vectors and intra-coded blocks, and storing the high-resolution block images to the high-resolution picture storage unit, and (S3b) when the low resolution mode is effective, converting a prediction error signal having been reproduced by using dequantization and inverse transform functions, to obtain a high-resolution prediction error signal corresponding to coded blocks with zero motion vectors, reconstructing high-resolution block images by adding the high-resolution prediction error signal to corresponding blocks of the high-resolution picture retrieved from the high-resolution picture storage unit, and updating the high-resolution picture stored in the high-resolution picture storage unit with the reconstructed high-resolution block images.

11. A video decoding method for receiving and decoding a predictive-coded video signal, which is implemented in a video decoding apparatus having a decoded picture storage unit and a high-resolution picture storage unit, the video decoding method comprising the steps of:

(S1) storing a decoded picture that has been reconstructed in a previous frame into the high-resolution picture storage unit;

(S2) reconstructing a decoded picture of the present frame from a reproduced prediction error signal, and storing the decoded picture into the decoded picture storage unit, and additionally storing the same decoded picture into the high-resolution picture storage unit only when the decoded picture has a high resolution; and (S3) converting the decoded picture to obtain a high-resolution block images corresponding to coded blocks when the decoded picture has a low resolution, and storing the high-resolution block images to the high-resolution picture storage unit.

12. The video decoding method according to claim 11, wherein said step (S3) comprises the substeps of:

(S3a) when the decoded picture has the low resolution, converting the decoded picture to obtain high-resolution block images corresponding to coded blocks with non-zero motion vectors and intra-coded blocks, and storing the high-resolution block images to the high-resolution picture storage unit, and (S3b) when the decoded picture has the low resolution, converting a prediction error signal having been reproduced by using dequantization and inverse transform functions, to obtain a high-resolution prediction error signal corresponding to coded blocks with zero motion vectors, reconstructing high-resolution block images by adding the high-resolution prediction error signal to corresponding blocks of the decoded picture retrieved from the high-resolution picture storage unit, and updating the decoded picture stored in the high-resolution picture storage unit with the reconstructed high-resolution block images.

* * * * *

UNITED STATES PATENT AND TRADEMARK OFFICE
CERTIFICATE OF CORRECTION

PATENT NO.: 6,078,617
DATED : June 20, 2000
INVENTOR(S): Akira NAKAGAWA, et al.

It is certified that errors appear in the above-identified patent and that said Letters Patent is hereby corrected as shown below:

On the title page:

[56] References Cited

Please insert the following references which were omitted from the cover page of the patent:

--Patent Abstracts of Japan No. 7-095566 published 4/7/95
Patent Abstracts of Japan No. 63-155896 published 6/29/88--

Signed and Sealed this

Twenty-fourth Day of April, 2001

Attest:

NICHOLAS P. GODICI

Attesting Officer

Acting Director of the United States Patent and Trademark Office